US009043367B2

(12) United States Patent
Green et al.

(10) Patent No.: US 9,043,367 B2
(45) Date of Patent: *May 26, 2015

(54) SELF-LEARNING DATA LENSES FOR CONVERSION OF INFORMATION FROM A FIRST FORM TO A SECOND FORM

(75) Inventors: Edward A. Green, Englewood, CO (US); Kevin L. Markey, Longmont, CO (US)

(73) Assignee: Oracle International Corporation, Redwood City, CA (US)

( * ) Notice: Subject to any disclaimer, the term of this patent is extended or adjusted under 35 U.S.C. 154(b) by 387 days.

This patent is subject to a terminal disclaimer.

(21) Appl. No.: 12/126,760

(22) Filed: May 23, 2008

(65) Prior Publication Data

US 2009/0164428 A1 Jun. 25, 2009

Related U.S. Application Data

(60) Provisional application No. 60/939,774, filed on May 23, 2007.

(51) Int. Cl.
  G06F 7/00 (2006.01)
  G06F 17/30 (2006.01)
(52) U.S. Cl.
  CPC .... G06F 17/30569 (2013.01); G06F 17/30436 (2013.01)

(58) Field of Classification Search
  USPC .................................................. 707/803, 809
  See application file for complete search history.

(56) References Cited

U.S. PATENT DOCUMENTS

| 5,497,319 | A * | 3/1996 | Chong et al. ................ 704/2 |
| 6,047,299 | A * | 4/2000 | Kaijima ................ 715/236 |
| 6,219,831 | B1* | 4/2001 | Ono ................ 717/136 |
| 6,424,983 | B1* | 7/2002 | Schabes et al. ................ 715/257 |
| 7,225,199 | B1* | 5/2007 | Green et al. ................ 1/1 |
| 2005/0288920 | A1* | 12/2005 | Green et al. ................ 704/3 |
| 2006/0167909 | A1* | 7/2006 | Mendis et al. ................ 707/101 |
| 2007/0143327 | A1* | 6/2007 | Rivas et al. ................ 707/101 |
| 2007/0250504 | A1* | 10/2007 | Chen et al. ................ 707/6 |

* cited by examiner

*Primary Examiner* — Loan T Nguyen
(74) *Attorney, Agent, or Firm* — Marsh Fischmann & Breyfogle LLP

(57) ABSTRACT

A semantic conversion system (1900) includes a self-learning tool (1902). The self-learning tool (1902) receives input files from legacy data systems (1904). The self-learning tool (1902) includes a conversion processor (1914) that can calculate probabilities associated with candidate conversion terms so as to select an appropriate conversion term. The self-learning tool (1902) provides a fully attributed and normalized data set (1908).

25 Claims, 20 Drawing Sheets

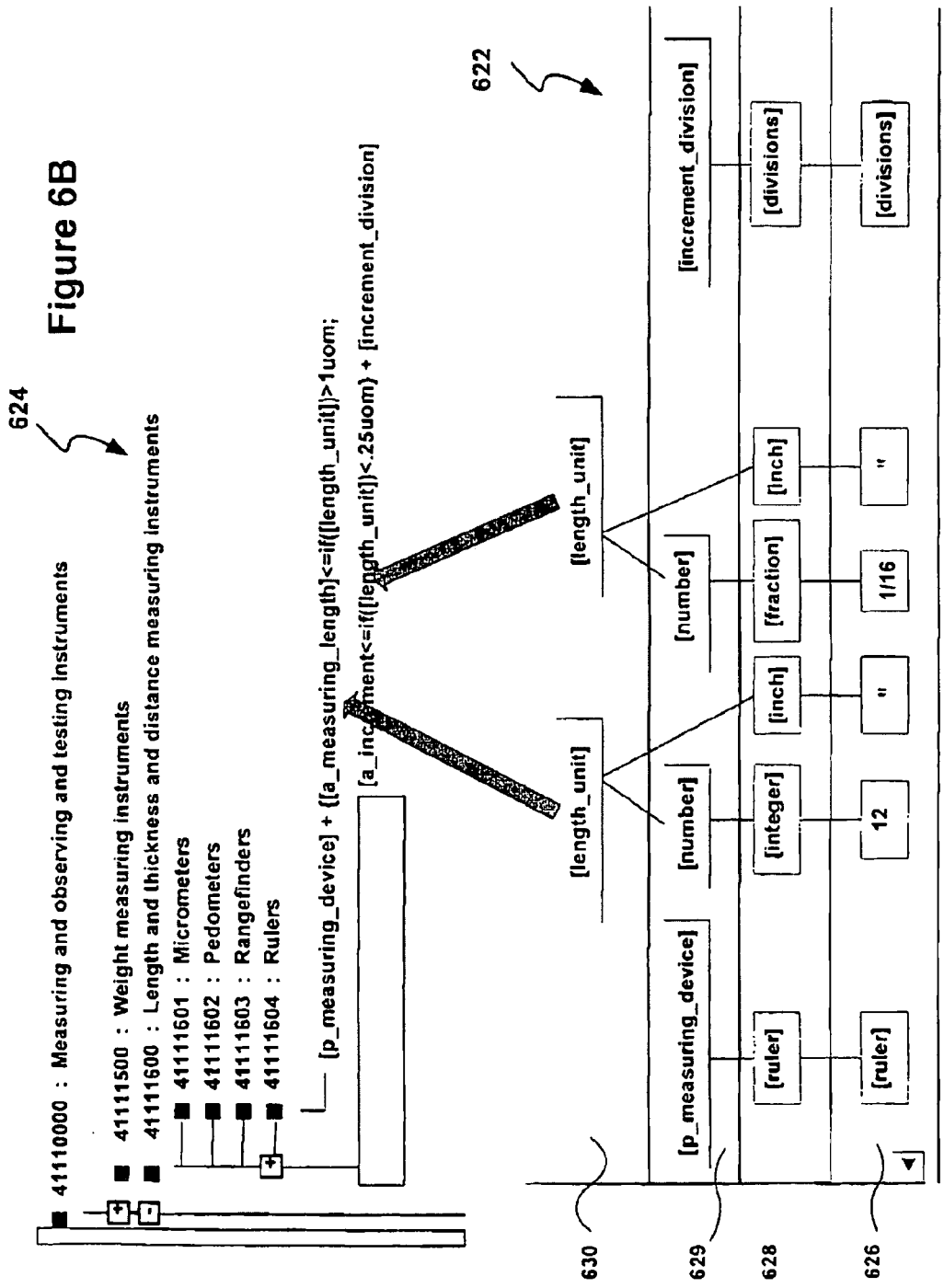

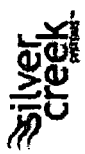

Standardized Training Data

| PARENT | MNRBNAME | OUNCES | PRODUCT TYPE | PACKAGE | FLAVOR/SCENT | STRENGTH | ADDITIVES | FORM |
|---|---|---|---|---|---|---|---|---|
| NEW DANA PERFUME | ENGLISH LEATHER | 2.5 | ANTI PERSPIRANT DEODORANT | | | | | ASSORTED |
| PROCTER & GAMBLE | GILLETTE SERIES | 12 | MIXED PRODUCT | PLASTIC WRAPPED PL | COOL WAVE | | | ASSORTED |
| PROCTER & GAMBLE | OLD SPICE HIGH ENDURANCE | 9.75 | ASSORTED | PLASTIC WRAPPED PL | ASSORTED | | | PUMP SPRAY |
| BURT'S BEES INC. | DOCTOR BURTS | 6 | DEODORANT | CAN | HERBAL | REGULAR STR | OIL OF SAGE | STICK |
| UNILEVER | AXE | 3 | DEODORANT | PLASTIC CONTAINER | TOUCH | | | STICK |
| A P DEAUVILLE | POWER STICK | 1.69 | DEODORANT | PLASTIC CONTAINER | SPORT | | | STICK |
| PROCTER & GAMBLE | OLD SPICE | 6.5 | DEODORANT | PLASTIC WRAPPED PL | ORIGINAL | | | STICK |
| COLGATE PALMOLIVE | MENNEN SPEED STICK IRISH SPRING | 2.69 | ANTI PERSPIRANT DE | PLASTIC CONTAINER | ICY BLAST | | | STICK |
| COMBE INC | AQUA VELVA ICE SPORT | 2.25 | DEODORANT | PLASTIC CONTAINER | COOLING | | | STICK |
| COLGATE PALMOLIVE | MENNEN SPEED STICK | 3.25 | DEODORANT | PLASTIC CONTAINER | MUSK | | | STICK |
| KISS MY FACE CORP | KISS MY FACE | 2.47 | DEODORANT | PLASTIC BOTTLE | SUMMER | | | STICK |
| HOT LOOKS | KUE | 2.25 | DEODORANT | PLASTIC CONTAINER | REGULAR | REGULAR STRENGTH | | STICK |
| UNILEVER | DEGREE | 6 | DEODORANT | PLASTIC WRAPPED PL | OCEAN BLAST | | | STICK |
| UNILEVER | AXE | 9 | DEODORANT | PLASTIC CONTAINER | ESSENCE | | | STICK |
| COLGATE PALMOLIVE | MENNEN SPEED STICK ULTIMATE | 6 | DEODORANT | PLASTIC WRAPPED PL | POWER SPORT | | | STICK |
| UNILEVER | AXE | 3 | DEODORANT | PLASTIC CONTAINER | KILO | | | STICK |
| A P DEAUVILLE | POWER STICK | 2.25 | ANTI PERSPIRANT DE | PLASTIC CONTAINER | MUSK | REGULAR STRENGTH | | STICK |
| ALBA BOTANICA COS | ALBA BOTANICA | 2.5 | DEODORANT | PLASTIC CONTAINER | UNSCENTED | | ALOE VERA | STICK |
| COLGATE PALMOLIVE | MENNEN SPEED STICK ULTIMATE | 5.39 | ANTI PERSPIRANT DE | PLASTIC WRAPPED PL | ACTIVE FRESH | | | STICK |
| FRED MEYER INC | PERFECT CHOICE | 3.25 | DEODORANT | PLASTIC CONTAINER | REGULAR | | | STICK |
| PROCTER & GAMBLE | OLD SPICE | 2.25 | DEODORANT | PLASTIC CONTAINER | ORIGINAL | | | STICK |
| UNILEVER | DEGREE | 12 | DEODORANT | PLASTIC CONTAINER | SILVER ICE | | | STICK |
| COTY | COTY ADIDAS ACTION 3 TECH | 2.79 | ANTI PERSPIRANT DE | PLASTIC CONTAINER | TEAM FORCE | | | STICK |
| PERCARA ENTERPRIS | PERCARA LADY STICK | 2 | DEODORANT | PLASTIC CONTAINER | SCENTED | | | STICK |
| A P DEAUVILLE | POWER STICK | 2.25 | ANTI PERSPIRANT DE | PLASTIC CONTAINER | POWER FRESH | REGULAR STRENGTH | | STICK |
| PERSONAL CARE PRO | PERSONAL CARE | 3.25 | DEODORANT | PLASTIC CONTAINER | FRESH SCENT | | | STICK |
| COLGATE PALMOLIVE | MENNEN LADY SPEED STICK | 5 | ANTI PERSPIRANT DE | PLASTIC WRAPPED PL | POWDER FRESH | | | STICK |
| COTY | COTY ADIDAS ACTION 3 TECH | 1.79 | ANTI PERSPIRANT DE | PLASTIC CONTAINER | SPORT FEVER | | | STICK |

Fig. 15

Page 24

Fig. 16

Item Definition From Training Data

Drag to Create New...
- All Of
- Any Of
- One Of

<Deodorant>
- Required:
  - Item_Name:
    - [l_deodorant]
    - [l_anti_perspirant]
    - [a_deodorant_brand_name]
  - Scoring:
    - Any Of
      - Scent:
        - [a_flavor_or_scent]
      - Weight_or_volume:
        - [a_weight]
        - [a_volume]
      - Form:
        - [e_form]
      - Strength?
- Optional:
  - Any Of
    - For_sale_packaging?
    - Company_or_parent?
    - Major_brand_name?
    - Additive:
      - [a_additive]
    - Absorbancy?
    - Package?
    - Count?
- Disallowed
- Unused

Context between items, not just within an item

OLD SP RD ZN SPRT SOL2.6      163147
OLD SPC RED ZONE SPRT2.6Z        163147
OLD SPC RED ZONE SPORT      2.6 OZ
OLD SPC RED ZONE SPRT SOL 1631472.6Z
OLD SPC RED ZONE SPRT SOL    (6) 2.6 OZ
OLD SPC RED ZONE SPRT SOL (6) 2.6 OZ
O S R/Z SPRT AP DEO 2.6OZ     163147
OS RED ZONE DAP SPRT DEOD   2.6 OZ
OS RZ PSW/OS 32Z BAR    N  2.6 OZ
2.6 Z LD SPC LDSPC HGH NDRNC RD ZN SLD N
OLD SPC RD ZN SPRT SOL AP      2.6 OZ
OLD SPC RD ZN SPRT A/P DE    2.6 OZ
OS RD ZN SPRT 2.6Z
OLD SPICE HE 2.25OZ ORIGINAL TWN PK
OLD SPICE HE 2.25OZ FRESH TWN PK
OLD SPICE HE 2.25OZ PURE SPT TWN PK
OLD SPICE HE DEOSPORT 2/2.25OZ
OLD SPC HE FRSH
OLD SPICE 3/3.25-OZ    GEL SOLID

Fig. 17

SELF-LEARNING DATA LENSES FOR CONVERSION OF INFORMATION FROM A FIRST FORM TO A SECOND FORM

CROSS-REFERENCE TO RELATED APPLICATION

This application claims priority under 35 U.S.C. 119 to U.S. Provisional Application No. 60/939,774, entitled, "Self-Learning Data Lenses," filed on May 23, 2007, the contents of which are incorporated herein as if set forth in full.

FIELD OF INVENTION

The present invention relates generally to machine-based tools for use in converting semantic information from a first form to a second form. In particular, the invention relates to a self-learning model for improved automation of semantic conversions.

BACKGROUND OF THE INVENTION

In a variety of contexts, it is desired to convert semantic information from a first or input form to a second or target form. Such conversions may involve, for example, linguistics, syntax and formats. In this regard, linguistic differences may be due to the use of different languages or, within a single language, due to terminology, proprietary names, abbreviations, idiosyncratic phrasings or structures and other matter that is specific to a location, region, business entity or unit, trade, organization or the like. Also within the purview of linguistic differences for present purposes are different currencies, different units of weights and measures and other systematic differences. Syntax relates to the phrasing, ordering and organization of terms as well as grammatic and other rules relating thereto. Differences in format may relate to data structures or conventions associated with a database or other application and associated tools.

One or more of these differences in form may need to be addressed in connection with a conversion process. In particular, at least linguistics or syntax generally needs to be addressed in the context of semantic conversions. Some examples of conversion environments include: importing data from one or more legacy systems into a target system; correlating or interpreting an external input (such as a search query) in relation to one or more defined collections of information; correlating or interpreting an external input in relation to one or more external documents, files or other sources of data; facilitating exchanges of information between systems; and translating words, phrases or documents. In all of these cases, a machine-based tool attempts to address differences in linguistics, syntax and/or formats between the input and target environments. It will be appreciated in this regard that the designations "input" and "target" are largely a matter of convenience and are process specific. That is, for example, in the context of facilitating exchanges of information between systems, which environment is the input environment and which is the target depends on which way a particular conversion is oriented and can therefore change.

One difficulty associated with machine-based conversion tools relates to properly handling context dependent conversions. In such cases, properly converting an item under consideration depends on understanding something about the context in which the item is used. For example, in the context of product descriptions, an attribute value of "one inch" might denote one inch in length, one inch in radius or some other dimension depending on the product under consideration. In the context of translation, the term "walking" functions differently in the phrase "walking shoe" than in "walking to work." Thus, in these examples and many others, understanding something about the context of an item under consideration may facilitate conversion. Although the value of context in disambiguating or otherwise properly converting information is well recognized, limited success has been achieved in applying this notion to machine-based tools.

Recently, products have become available to automate certain aspects of the conversion process. One such product is the DataLens™ System of Silver Creek Systems (Superior, Colo.). That product allows for normalization of unstructured or otherwise incomplete, incompatible or problematic semantic information (e.g., product descriptors, search strings or other semantic content) to facilitate conversion processes as described above. That product can apply significant intelligence to resolve ambiguities based on context and can identify potential conversion errors based on rules related to valid attributes and attribute values. This has proved to be a significant advance in reducing the labor required for such processes and improving accuracy. However, even that product requires some knowledge base to perform efficiently and accurately. While much knowledge can be reused in subsequent conversion contexts, establishing such a knowledge base has generally required some time investment by a subject matter expert or other operator. It would be highly desirable to improve automation in this regard and reduce the required time investment.

SUMMARY OF THE INVENTION

The present invention is directed to a self-learning tool for facilitating data conversion processes. The tool can statistically analyze a set of sample data to develop a knowledge base for use in converting subsequent input strings. In this regard, the self-learning tool can leverage existing conversion rules and/or develop conversion rules that are useful to recognize valid or necessary attributes and attribute values and to disambiguate semantic terms. Moreover, the tool can use statistical information and items of evidence or observations to establish probabilities in relation to candidate conversion terms so as to enhance term recognition. The self-learning tool thereby significantly reduces the time investment and expense associated with developing a knowledge base and executing a conversion process and enhances the accuracy of such tools.

In many cases, a set of sample data is available that can be analyzed to statistically infer some knowledge for use in conversion processes. For example, one common type of conversion process relates to aggregating and standardizing product information from various legacy data systems of an enterprise. In this context, a data string may describe one or more products. Each product descriptor may include a number of attributes, e.g., product names, sizes, qualities, etc., and associated attribute values.

In such applications, there is typically a large amount of data that is incomplete or difficult to understand. However, there is also often some amount of data that is readily understood. For example, such data may be fully attributed and parseable or, at least, be capable of yielding reliable and accurate product information to a conversion tool with minimal training specific to that application. Such data can be analyzed to provide statistical data about the conversion environment which, in turn, can allow the conversion tool to generate a set of candidate conversion terms, for a term at issue, and associate meaningful probabilities with those terms so as to increase the likelihood of accurately resolving ambiguities. In this manner, the conversion tool implements a significant degree of self-learning and reduces the time investment required for training.

In accordance with one aspect of the present invention, a method and apparatus ("utility") are provided for converting semantic information using subject matter context and an analysis of candidate conversion terms. The utility involves obtaining an input string and identifying a source term of the string for conversion. For example, the input string may include unstructured semantic information, information structured in accordance with a legacy data structure, a search string, or other input depending on the application. The source term may be identified from the input string by using a machine based tool to parse the string and select one of the resulting terms.

The utility further involves identifying a subject matter context of the string. This may be accomplished, for example, by receiving a user input explicitly identifying the subject matter context or by inferring the subject matter context from analysis of the string or another set of sample data. In the latter regard, the subject matter context may be indicated by a classification or frame-slot structure of the data which, in turn, may be provided by a user and/or inferred from the data. Such data structures have been provided to resolve linguistic ambiguities related to conversion processes.

In particular, it has been recognized that conversion processes can benefit from context dependent conversion rules that allow for, inter alia, appropriate resolution of ambiguities. Just as humans can often readily resolve such ambiguities based on an understanding of a surrounding context, machine-based tools can be adapted to identify contextual cues and to access and apply context dependent rules and conversion processes. Such context cues can be reflected, in accordance with the present invention, by a parse-tree structure, a frame-slot architecture or a combination thereof. The present inventors have recognized that the frame-slot architecture has particular advantages for certain applications, but each approach has significant utility as discussed below.

The parse-tree involves developing a classification structure by which terms under consideration can be mapped to or associated with a particular classification taxonomy. For example, in the context of a database or catalog of business products, a product attribute term may be associated with a parent product classification, which in turn belongs to a grandparent product grouping classification, etc. The associated classification structure may be referred to as a parse tree. By accessing rules appropriate to this classification structure, conversions can be executed with improved accuracy. This represents a substantial improvement in relation to conventional conversion tools.

However, such a classification taxonomy entails certain inefficiencies. First, in order to encompass a subject matter area of significant size or complexity to a useful degree of classification granularity, very deep parses may be required reflecting a complicated parse tree. These deep parses require substantial effort and processing resources to develop and implement. Moreover, the resulting classification structures impose significant rigidity on the associated conversion processes such that it may be difficult to adapt the structures to a new conversion environment or to reuse rules and structures as may be desired. Moreover, such predefined, complex structures have limited ability to leverage context cues that may exist in source structured data or that may otherwise be inferred based on an understanding of the subject matter at issue, thereby failing to realize potential efficiencies.

A frame-slot architecture can alternatively be utilized to identify the subject matter context. In this regard, a frame represents an intersection between a contextual cue recognized by the machine tool, associated content and related constraint information specific to that conversion environment, whereas a slot-represents an included chunk of information. For example, in the context of product descriptions, a chunk of information such as "1 inch roller bearing" may be recognized by the machine tool logic or grammar as an attribute phrase. The term "1 inch" may then be recognized as an attribute value. In the context of describing a "roller bearing," it may be readily understood that "1 inch" represents a radius dimension and not a length, width, height or similar rectilinear designation. Such contextual cues can be inferred from a general, public understanding of the subject matter, i.e., what a roller bearing is. Such understanding is a kind of public schema. Moreover, an associated private schema may define acceptable values or ranges for this attribute. For example, only certain values or a certain values range for the attribute at issue may be "legal"; that is, only those values may be acceptable within rules defined by an interested entity. In many cases, such private schema may be pre-defined and thus available for use in a conversion process prior to any detailed analysis of the data sets at issue. The attribute value can be compared to such constraints to confirm the identification of the attribute phrase or to identify corrupted or nonconforming data.

The frame is thus a specification of context or other disambiguating cues at or close to the whole-record level, less sensitive to syntax and more sensitive to the intersection of attributes and their values. Thus, a frame functions as a container for grammatical information used to convert data, analogous to a software object. The frame-slot architecture thus can resolve ambiguities without deep parses and yields flexible and more readily reusable syntactic rules. Moreover, constraint information is readily available, e.g., for attribute values, thus allowing for more confidence in conversions and better recognition of conversion anomalies. As discussed below, certain frame-slot relationships may be developed based on an analysis of a sample data set.

The noted utility further involves establishing a set of candidate conversion terms based on the subject matter context, analyzing the candidate terms to select one of the terms and using the selected term to convert the source term from a source form to the target form. It will be appreciated that a variety of tools exist for matching an input term to a term of a dictionary or other data set. These tools may account for misspellings, abbreviations, synonyms, etc. An example of such a tool is a spell check function of a word processing application. Such tools can perform the matching function, for example, by scoring the number or magnitude of changes required to move from the input term to the candidate term or vice versa.

The present aspect of the invention improves on such functionality by taking subject matter into account in this regard. For example, if the frame of the input string is known (e.g., given or inferred), candidate terms may be selected in relation to a set of potential attributes and attribute values of that frame. Similarly, if a sample set of training data has been provided, that sample set may be used to populate a dictionary for use in selecting candidate terms or provide a preferred source for candidate terms. The resulting candidate terms can then be analyzed using a statistical analysis, e.g., a Bayesian Inference process, as will be discussed in more detail below, to select the candidate term deemed most likely to be a, or the, correct term for conversion. That term may provide the target form term or may be used to obtain the target form. For example, the selected candidate term may be a normalized intermediate term which is then converted to the target form or additional rules may otherwise be applied to arrive at the target form.

In accordance with another aspect of the present invention, candidate conversion terms are statistically analyzed to identify a correct conversion term or term deemed most likely correct of the candidate terms. The associated utility involves obtaining a set of at least two candidate conversion terms for a given source term and analyzing each of the conversion terms in relation to a series of pieces of evidence, where each piece of evidence has an impact on the likelihood that the candidate term under consideration is a correct conversion term.

For example, the pieces of evidence may relate to attribute values associated with the term under consideration, other attributes and attribute values in a string, containing the term under consideration, the prevalence of the term in a set of sample data, etc. In this manner, a progressive determination can be made regarding the correct conversion term. For example, Bayesian inference process can be used to establish and update a probability, based on successive pieces of evidence or observations, that a candidate term is correct. Upon analyzing all available, or a determined amount of evidence, the candidate with the highest resulting probability may be used to convert the given source term to the target form.

BRIEF DESCRIPTION OF THE DRAWINGS

For a more complete understanding of the present invention and further advantages thereof, reference is now made to the following detailed description taken in conjunction with the drawings, in which:

FIG. 15 is a user interface screen showing standardized training data for use by a self-learning conversion tool in accordance with the present invention;

FIG. 16 is a user interface screen showing an item definition parse tree developed from the training data of FIG. 15;

FIG. 17 is a user interface screen showing a set of product descriptors that can be used to infer context in accordance with the present invention;

DETAILED DESCRIPTION

Figure 1:
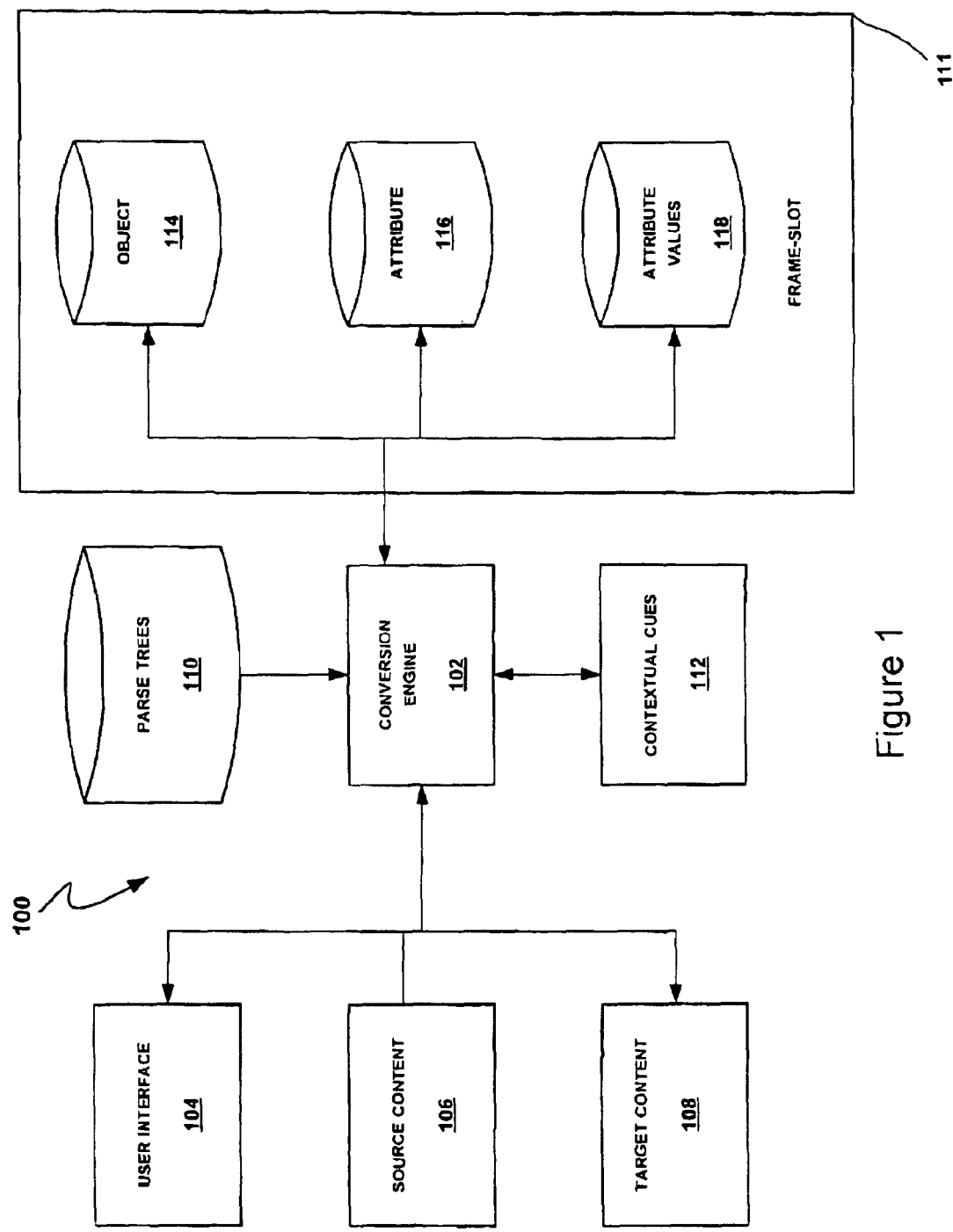
FIG. 1 is a schematic diagram of a semantic conversion system in accordance with the present invention.

The present invention relates to converting data from a first or source form to a second or target form. As noted above, such conversions may be desired in a variety of contexts relating, for example, to importing data into or otherwise populating an information system, processing a search query, exchanging information between information systems and translation. In the following description, the invention is set forth in the context of particular examples relating to processing a source string including a product oriented attribute phrase. Such strings may include information identifying a product or product type together with a specification of one or more attributes and associated attribute values. For example, the source string (e.g., a search query or product descriptor from a legacy information system) may include the content "8 oz. ceramic coffee cup." In this case, the product may be defined by the phrase "coffee cup" and the implicit attributes of size and material have attribute values of "8 oz." and "ceramic" respectively.

While such source strings including product oriented attribute phrases provide a useful mechanism for illustrating various aspects of the invention, and in fact represent significant commercial implementations of the invention, it should be appreciated that the invention is not limited to such environments. Indeed, it is believed that aspects of the invention are applicable to virtually any other conversion environment with concepts such as product attributes and attribute values replaced, as necessary, by logical constructs appropriate to the subject environment, e.g., part of speech and form. Moreover, as noted above, the conversion rules are not limited to elements of a single attribute phrase or analog, but may involve relationships between objects, including objects set forth in separate phrases. Accordingly, the specific examples below should be understood as exemplifying the invention and not by way of limitation.

In a preferred implementation of the invention, statistical processes are employed to develop and train a conversion for a given conversion application as well as to operate the conversion tool to execute a conversion process. These statistical analyses are enhanced by implementing the analyses in relation to a particular subject matter context, e.g., so as to obtain subject matter specific information related to a subject matter context reflected in a single record, such as a product descriptor string, or a subject matter context developed based on consideration of multiple records. In the former regard, single record subject matter context cues may be recognized, for example, a dictionary of relevant terms, a frequency of term usage and attributes or attribute values likely to appear together (or not appear together). This subject matter context may relate to, for example, by using a frame-slot architecture and/or a parse tree structure. In the following discussion, such single record subject matter context assisted conversion processes are first described. Thereafter, the self-learning tool and functionality, using multi-record subject matter context cues and statistical processing, is described in more detail.

1. Single Record Subject Matter Context

In the implementations described below, at least some conversions are executed with the assistance of a frame-slot architecture. Such a frame-slot architecture may function independently to define a full conversion model for a given conversion application, or may function in conjunction with one or more parse tree structures to define a conversion model. In the latter regard, the frame-slot architecture and parse tree structures may overlap with respect to subject matter. Those technologies are generally, though not exclusively, described below in relation to obtaining subject matter context cues from a single record.

The above-noted coffee cup example is illustrative in this regard. It may be desired to correlate the source string "8 oz. ceramic coffee cup" to a product database, electronic catalogue, web-based product information or other product listing. Such a product listing may include a variety of product types, each of which may have associated attributes and grammar rules. In this regard, the product types and attributes may be organized by one or more parse-tree structures. These parse tree structures, which are described and shown in U.S. patent application Ser. No. 10/970,372, generally organize a given subject matter into a hierarchy of classes, subclasses, etc., down to the desired level of granularity, and are useful for improving conversion accuracy and improving efficiency in building a grammar among other things. In this case, "coffee cup" may fall under a parse tree node "cups" which, in turn, falls under a parent node "containers" which falls under "housewares," etc. Similarly, the same or another parse tree may group the term "oz.", or a standardized expression thereof (e.g., defined by a grammar) such as "ounce" under the node "fluid measurements" (ounce may also appear under a heading such as "weights" with appropriate grammar rules for disambiguation) which, in turn, may fall under the parent node "measurements", etc.

As noted above, such a parse tree structure has certain efficiencies in connection with conversion processes. However, in some cases, very deep parses may be required, e.g., in connection with processing terms associated with large data systems. Moreover, such terms are often processed as individual fields of data rather than closer to the whole record level, thereby potentially losing contextual cues that enhance conversion accuracy and missing opportunities to quickly identify content anomalies or implement private schema to define legal attributes or values for a given information object. Finally, such parse tree processes may impose a rigid structure that limits applicability to a specific subject matter context, thereby limiting reuse of grammar segments.

By contrast, a frame-slot architecture allows for consideration of source string information at, or closer to, the whole record level. This enables substantial unification of ontology and syntax, e.g., collective consideration of attribute phrases, recognized by the grammar and attribute values contained therein. Moreover, this architecture allows for consideration of contextual cues, within or outside of the content to be converted or other external constraints or other external information. In the coffee cup example, the frame-slot architecture allows for consideration of the source string "8 oz. coffee cup" in its entirety. In this regard, this string may be recognized as an attribute phrase, having "coffee cup" as an object. Grammar rules specific to this object or a class including this object or rules of a public schema may allow for recognition that "oz." means "ounce" and "ounce" in this context is a fluid measure, not a weight measure. A user-defined schema, for example, a private schema of the source or target information owner, may limit legal quantity values associated with "ounce" in the context of coffee cups to, for example, "6", "8" and "16". In this case, recognition of "8" by the schema provides increased confidence concerning the conversion. If the value had been "12", which would not comply with the schema in this example, this might serve, for example to quickly identify an anomaly (e.g., in the case of mapping records from a legacy data system to a target system) or identify an imperfect match (e.g., in the case of a search query) so that appropriate action may be taken.

The frame-slot architecture thus encompasses a utility for recognizing string segments or terms, obtaining contextual cues from within or external to the string, accessing grammar rules specific to the subject matter of the string segment and converting the string segment. This may avoid deep parses and allow for greater conversion confidence and accuracy. Moreover, greater grammar flexibility is enabled, thus allowing for a higher degree of potential reuse in other conversion contexts. In addition, executing such processes by reference to a schema enables improved context-related analysis. In short, conversions benefit from surrounding and external context cues in a manner analogous to human processing.

As noted above, the frame-slot architecture may be developed in a top-down or bottom-up fashion. For example, objects, associated attributes and legal attribute values may be defined as schema that are imposed on the data. In the coffee cup example, all of these may be defined based on an analysis of a product inventory or the structure of a legacy information system. In either case, the schema may dictate the legal values for quantity to 6, 8 and 16. Any information not conforming to the schema would then be identified and processed as an anomaly. Conversely, the legal values may be defined based on the data. For example, files from a legacy information system may be used to define the legal attribute values which, then, develop as a function of the input information. As discussed in the second section of this description below, a sample set of data can be statistically analyzed in relation to such a frame-slot architecture for improved automation of system training and conversion process execution. Such statistical analysis may be used to at least partially automate development of the frame-slot architecture.

FIG. 1 illustrates a system 100 for implementing such conversion processing. The illustrated system 100 includes a conversion engine 102 that is operative to execute various grammar rules and conversion rules for converting source information to a target form. In the illustrated embodiment, the system 100 is operative to execute both frame-slot architecture methodology and parse tree structure methodology. However, it will be appreciated that a frame-slot architecture may be executed in accordance with the present invention in the absence of a cooperating parse tree environment.

The illustrated grammar engine receives inputs and/or provides outputs via a workstation associated with the user interface 104. For example, in a set-up mode, a user may select terms for processing and create associated relationships and grammar rules via the user interface 104. In the context of a search system, a search query may be entered, and search results may be received, via the user interface 104. In this regard, the grammar engine 102 may be resident at the work station associated with the user interface 104, or may communicate with such a work station via a local or wide area network.

The source content 106 includes the source string to be converted. Depending on the specific application, this content 106 may come from any of a variety of sources. Thus, in the case of an application involving transferring information from one or more legacy information systems into a target information system, the source content 106 may be accessed from the legacy systems. In the case of a search engine application, the source content may be derived from a query. In other cases, the source content 106 may be obtained from a text to be translated or otherwise converted. The source content 106 may be preprocessed to facilitate conversion or may be in raw form. In the case of preprocessing, the raw content may be supplemented, for example, with markers to indicate phrase boundaries, tags to indicate context information, or other matter. Such matter may be provided in a set-up mode process. In addition, some such information may be present in a legacy system and may be used by the conversion engine 102. It will be appreciated that the sources of the content 106 and the nature thereof is substantially unlimited.

The illustrated conversion engine 102 performs a number of functions. In this regard, the engine 102 is operative to process the source content 106 to parse the content into potential objects and attributes, identify the associated attribute values, and, in some cases, recognize contextual cues and other matter additional to the content to be transformed that may be present in the source content. The engine 102 then operates to convert the relevant portion of the source content 106 using a parse tree structure 110 and/or a frame-slot architecture 111, and provides a converted output, e.g., to a user or target system.

With regard to the parse tree structure 100, such a structure is generally developed using the conversion engine 102 in a set-up mode. The nodes of the parse tree structure 110 may be defined by someone familiar with the subject matter under consideration or based on an analysis of a data set. Moreover, certain structure developed in connection with prior conversion applications may be imported to facilitate the set-up process. Such a set-up process is described in U.S. patent application Ser. No. 10/970,372, which is incorporated herein by reference. At a high level, this set-up involves defining the hierarchical structure of the tree, populating the various nodes of the tree, developing standardized terminology and syntax and associated grammar and conversion rules associated with the tree and mapping source content variants to the standardized terminology and syntax.

In the case of the frame-slot architecture 111, the conversion engine 102 obtains the source content 102 and identifies potential objects, attributes and attribute values therein. In this regard, the source content 106 may be parsed as discussed above. In addition, the engine 102 may obtain contextual cues 112 to assist in the conversion. As noted above, such cues may be internal or external to the source content 106. External cues may be based on the identity or structure of a source information system, defined by a schema specific to the frame-slot conversion, or based on information regarding the subject matter under consideration obtained from any external source. For example, information indicating that, when used in connection with "coffee cup" the term "ounce" is a fluid (not a weight) measure, may be encoded into metadata of a legacy information system, defined by a private schema developed for the subject conversion application or derived from an analysis of external information sources.

In the context of the frame-slot architecture, the conversion engine is operative to: identify potential objects, attributes and attribute values; process such information in relation to certain stored information concerning the objects, attributes and attribute values; access associated grammar and conversion rules; and convert the information from the source form to a target form. In this regard, the illustrated system 100 includes stored object information 114, stored attribute information 116 and stored attribute value information 118. This information may be defined by a public or private schema or by reference to external information regarding the subject matter under consideration. For example, the object information 114 may include a list of recognized objects for which the frame-slot architecture is applicable together with information associating the object with legal attributes and/or attribute values and other conversion rules associated with that object. The attribute information 116 may include a definition of legal attributes for the object together with information regarding associated attribute values and associated grammar and conversion rules. Finally, the attribute value information 118 may include a definition of legal attribute values for given attributes together with associated information concerning grammar and conversion rules.

Figure 2:
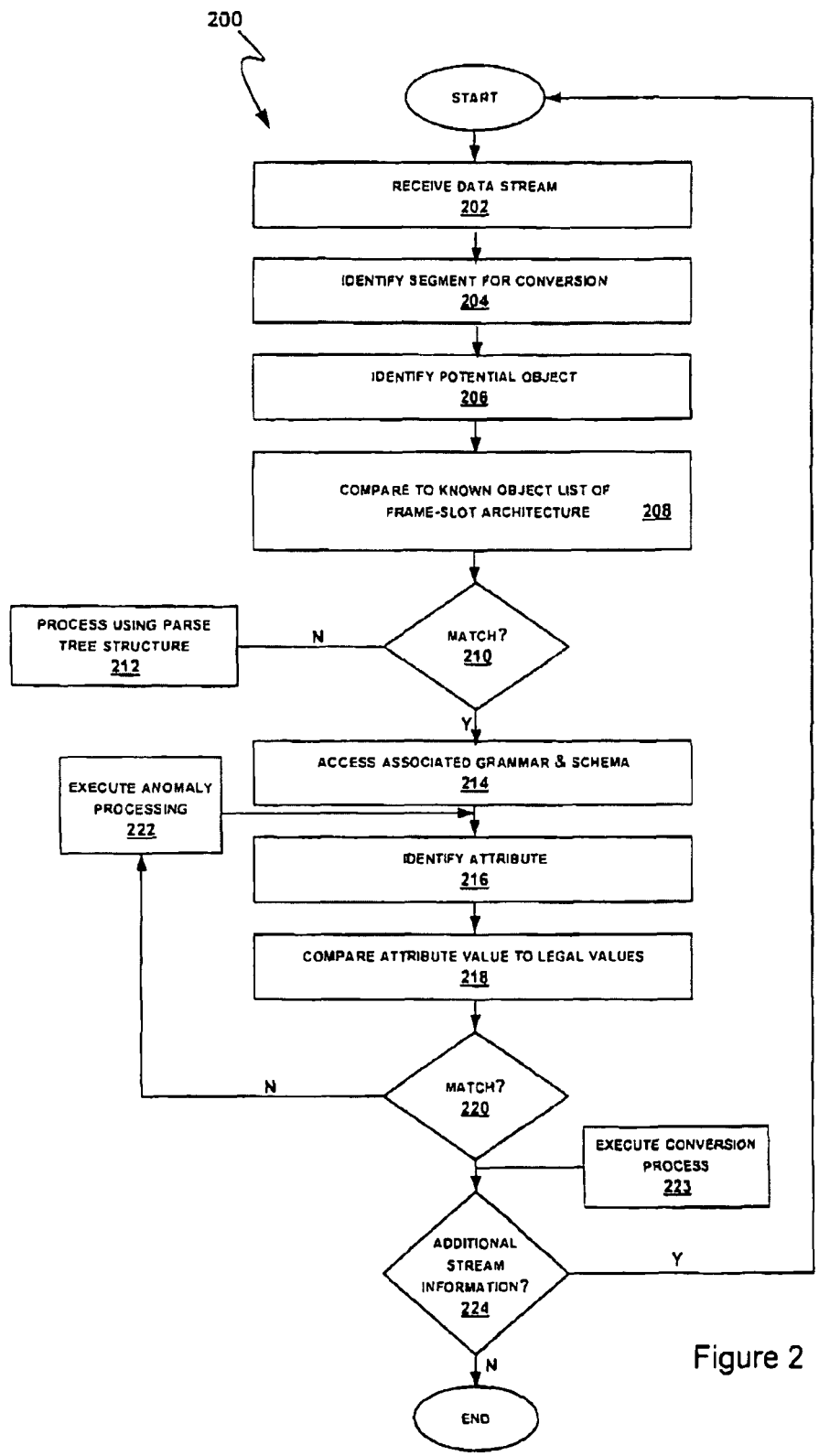
FIG. 2 is a flow chart illustrating a semantic conversion process in accordance with the present invention.

FIG. 2 shows a flow chart illustrating a process 200 that may be implemented by a conversion system such as described above. It will be appreciated that the various process steps illustrated in FIG. 2 may be combined or modified as to sequence or otherwise. Moreover, the illustrated process 200 relates to a system that executes a parse tree structure as well as a frame-slot architecture. It will be appreciated that a frame-slot architecture in accordance with the present invention may be implemented independent of any associated parse tree structure.

The illustrated process 200 is initiated by receiving (202) a data string from a data source. Such a data string may be entered by a user or accessed from a legacy or other information system. A segment of the data string is then identified (204) for conversion. For example, the segment may comprise an attribute phrase or any other chunk of source data that may be usefully processed in a collective form. Such a segment may be identified as the entirety of an input such as a search query, the entirety or a portion of a file from a legacy or other information system, or based on a prior processing step whereby phrase boundaries have been marked for purposes of conversion processing or based on logic for recognizing attribute phrases or other chunks to be coprocessed.

In the illustrated process 200 the identified segment is then processed to identify (206) a potential object within the segment. In the case of the coffee cup example above, the object may be identified as the term "cup" or "coffee cup." The potential object may be identified by comparison of individual terms to a collection of recognized objects or based on a preprocessing step wherein metadata has been associated with the source content to identify components thereof including objects. The potential object is then compared (208) to a known object list of a frame-slot architecture. As discussed above, within a given subject matter, there may be a defined subset for which frame-slot processing is possible. In the illustrated process 200, if a match (210) is identified, the system then accesses (214) an associated grammar and schema for processing in accordance with the frame-slot architecture. Otherwise, the segment is processed (212) using a parse tree structure. As a further alternative, if no object is recognized, an error message may be generated or the segment may be highlighted for set-up processing for out of vocabulary terms, e.g., so as to expand the vocabulary and associated grammar rules.

In the case of processing using the frame-slot architecture, an attribute associated with the object is then identified (216). In the coffee cup example, the terms "ceramic" or "8 oz." may be identified as reflecting attributes. Such identification may be accomplished based on grammar rules or based on metadata associated with such terms by which such terms are associated with particular attribute fields. The associated attribute values are then compared (218) to legal values. For example, the value of "8 oz." may be compared to a listing of legal values for the attribute "fluid measurement" in the context of "coffee cup." These legal values may be defined by a private schema, for example, limited to the inventory of an entity's product catalog or may be based on other external information (e.g., defining a legal word form based on part of speech). If a match is found (220) then the attribute phrase is recognized and an appropriate conversion process if executed (223) in accordance with the associated grammar and conversion rules. The process 200 then determines whether additional string information (224) is available for processing and either processes such additional information or terminates execution.

In the case where the attribute value does not match a legal value, anomaly processing is executed (222). How anomalies are processed generally depends on the application and context. For example, if an anomaly is identified during a set-up process, the anomalous attribute value may be verified and added to the legal values listing. For example, in the coffee cup example, if the attribute value is "12 oz." and that value does not match a previously defined legal value but, in fact, represents a valid inventory entry, the term "12 oz." (or a standardized version thereof) may be added to the legal values list for the attribute "fluid measurement" in the context of "coffee cup."

Alternatively, further processing may indicate that the attribute value is incorrect. For example, if the attribute value was "6 pack," an error in parsing may be indicated. In this case, an appropriate error message may be generated or the segment may be reprocessed to associate an alternate attribute type, e.g., "object quantity," with the term under consideration.

In other contexts, different anomaly processing may be executed. For example, in the case of processing a search query, illegal values may be ignored or closest match algorithms may be executed. Thus, in the case of a query directed to a "12 oz. coffee cup," search results may be generated or a link may be executed relative to inventory related to coffee cups in general or to 8 and 16 oz. coffee cups. It will be appreciated that many other types of anomaly processing are possible in accordance with the present invention.

Figure 4:
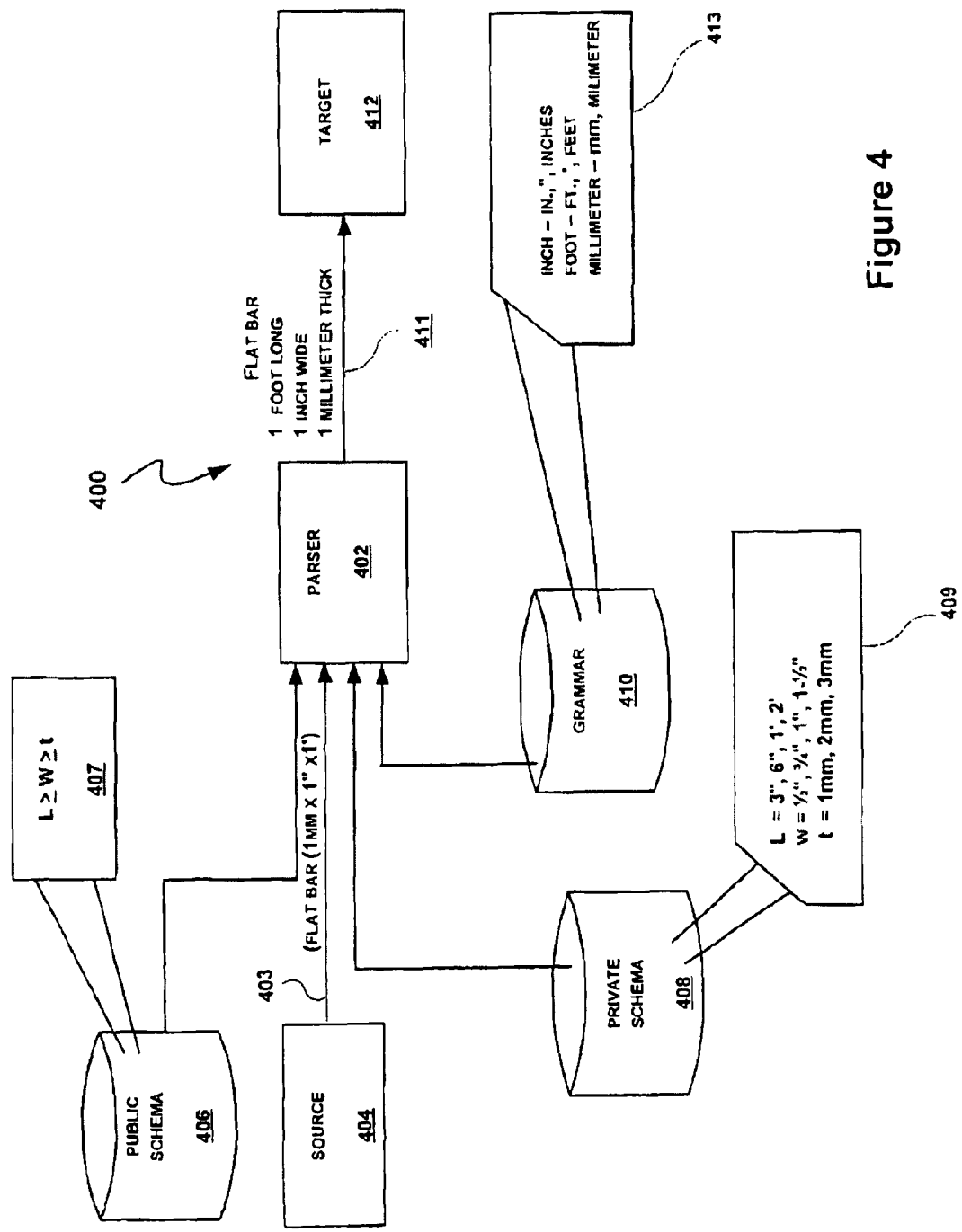
FIG. 4 is a schematic diagram illustrating the use of public and private schema in a conversion process in accordance with the present invention.
Figure 5:
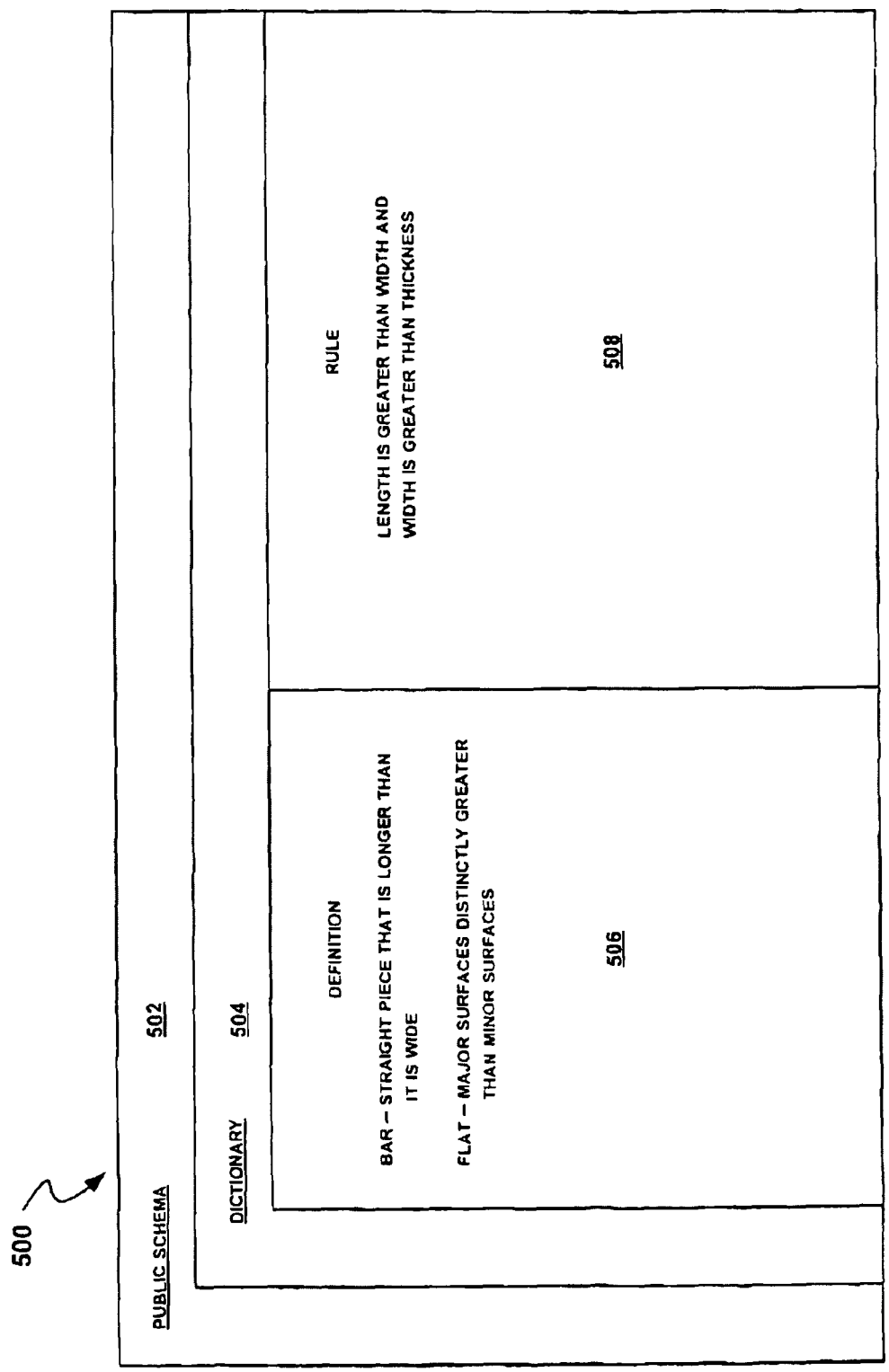
FIGS. 5-6B illustrate exemplary user interfaces in accordance with the present invention.

In the above examples, the conversion system can implement both a frame-slot architecture and a parse tree structure. This architecture and structure will now be described in more detail. Referring first to FIG. 4, a schematic diagram of a conversion system 400 in accordance with the present invention is shown. The illustrated conversion system 400 includes a parser 402 for use in parsing and converting an input string 403 from a source 404 to provide an output string 411 in a form for use by a target system 412. In this case, the source string 403 includes the content "flat bar (1 mm×1"×1')." To accomplish the desired conversion, the parser 402 uses information from a public schema 406, a private schema 408 and a grammar 410. The public schema 406 may include any of various types of information that is generally applicable to the subject matter and is not specific to any entity or group of entities. In this regard, FIG. 5 illustrates an example structure 500 showing how public information related to the subject matter area may be used to define a conversion rule. As shown, a new structure 500 includes a dictionary 504 that forms a portion of the public schema 502. Panel 506 shows definitions related to the object "flat bar." Specifically, "bar" is defined as "straight piece that is longer than it is wide" and "flat" is defined as including "major surfaces distinctly greater than minor surfaces." Such definitions may be obtained from, for example, a general purpose dictionary, a dictionary specific to the subject matter, a subject matter expert or any other suitable source. These definitions are translated to define a rule as shown in panel 508. Specifically, the associated rule indicates that "length is greater than width and width is greater than thickness." This rule may then be written into the logic of a machine-based conversion tool. Referring again to FIG. 4, this rule is reflected in file 407 of public schema 406.

Figure 6A:
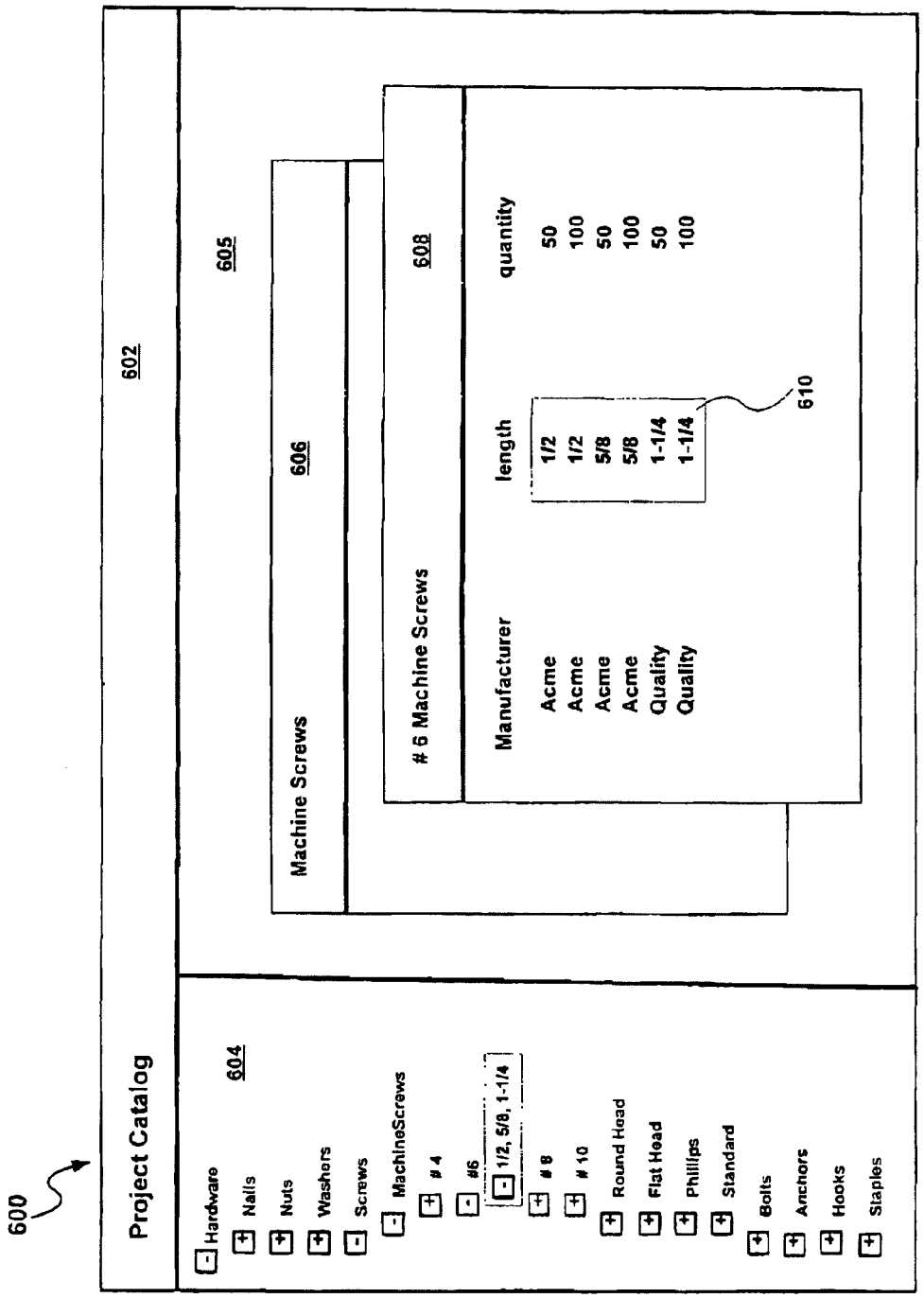

The parser 402 also receives input information from private schema 408 in the illustrated example. The private schema 408 may include conversion rules that are specific to an entity or group of entities less than the public as a whole. For example, the private schema 408 may define legal values for a given attribute based on a catalog or inventory of an interested entity such as an entity associated with the target system 412. An associated user interface 600 is shown in FIG. 6A. For example, the user interface 600 may be used in a start-up mode to populate the legal values for a given attribute. In this case, the user interface is associated with a particular project 602 such as assembling an electronic catalog. The illustrated user interface 600 includes a data structure panel 604, in this case reflecting a parse-tree structure and a frame-slot structure. The interface 600 further includes a private schema panel 605. In this case, the private schema panel 605 includes a number of windows 606 and 608 that define a product inventory of a target company. In this case, a length field 610 associated with a table for #6 machine screws is used to define legal attribute value 612 at a node of panel 604 corresponding to attribute values for #6 machine screws. Associated legal value information is shown as a file 409 of the private schema 408 in FIG. 4.

A further example of user interface segments 620 is shown in FIG. 6B Specifically, FIG. 6B shows a parse tree graphics panel 622 and a parse tree node map panel 624. For purposes of illustration, these panes 622 and 624 are shown in a stacked arrangement. However, it should be appreciated that the panels 622 and 624 may be otherwise arranged on a user interface screen or provided on separate screens. Panel 622 shows a parse tree for a particular product descriptor. In this case, the product descriptor is shown at the base level 626 of the parse tree as "ruler 12" /1;16" divisions." Layers 628-630 show patent nodes of the parse tree. Of particular interest, both of the chunks "12"" and "¹⁄₁₆"" are associated with the high level node "[length_unit]" reflecting the recognition by a parse tool that each of these chunks indicates a measure of length.

If the parse tree structure went no deeper, and there was not frame-slot logic available, these two length measures would present an ambiguity. However, human reader would readily recognize that, in the context of rulers, "12"" likely represents the overall length of the ruler and "¹⁄₁₆"" most likely represents measurement increments. In the case of a frame-slot architecture, such logic can be captured by a rule that enables the parse tool to recognize and apply such context cues to provide accurate interpretations without deep parses.

In this case, such a rule is reflected within the parse tree node map of panel 624. Specifically, a rule for interpreting "length unit" designations in the context of rulers (and, perhaps, other length measuring devices) is encoded under the "ruler" node. As shown, the rule interprets a given "length unit" as indicating "a measuring length" if the associated attribute value is greater than 1 unit of measure (uom) and treats the "length unit" as indicating an "increment" if the associated attribute value is less than 0.25 uom. This provides a certain and structurally efficient mechanism for disambiguating and converting length units in this context. Moreover, it is anticipated that such rules will be reuseable in other contexts within a project (e.g., for tape measures or straight edges) and in other projects.

Grammar 410 also provides information to the parser 402. The grammar may provide any of various information defining a lexicon, syntax and an ontology for the conversion process. In this regard, the grammar may involve definition of standardized terminology described in U.S. patent application Ser. No. 10/970,372. Thus, in the illustrated example, file 413 associates the standardized terms "inch," "foot," and "millimeter" with various alternate forms thereof.

The parser 402 can then use the input from the public schema 406, private schema 408 and grammar 410 to interpret the input string 403 to provide an output string 411 to the target 412. In this case, the noted input string 403 is interpreted as "flat bar-1' long, 1" wide and 1 mm thick.

Figure 3:
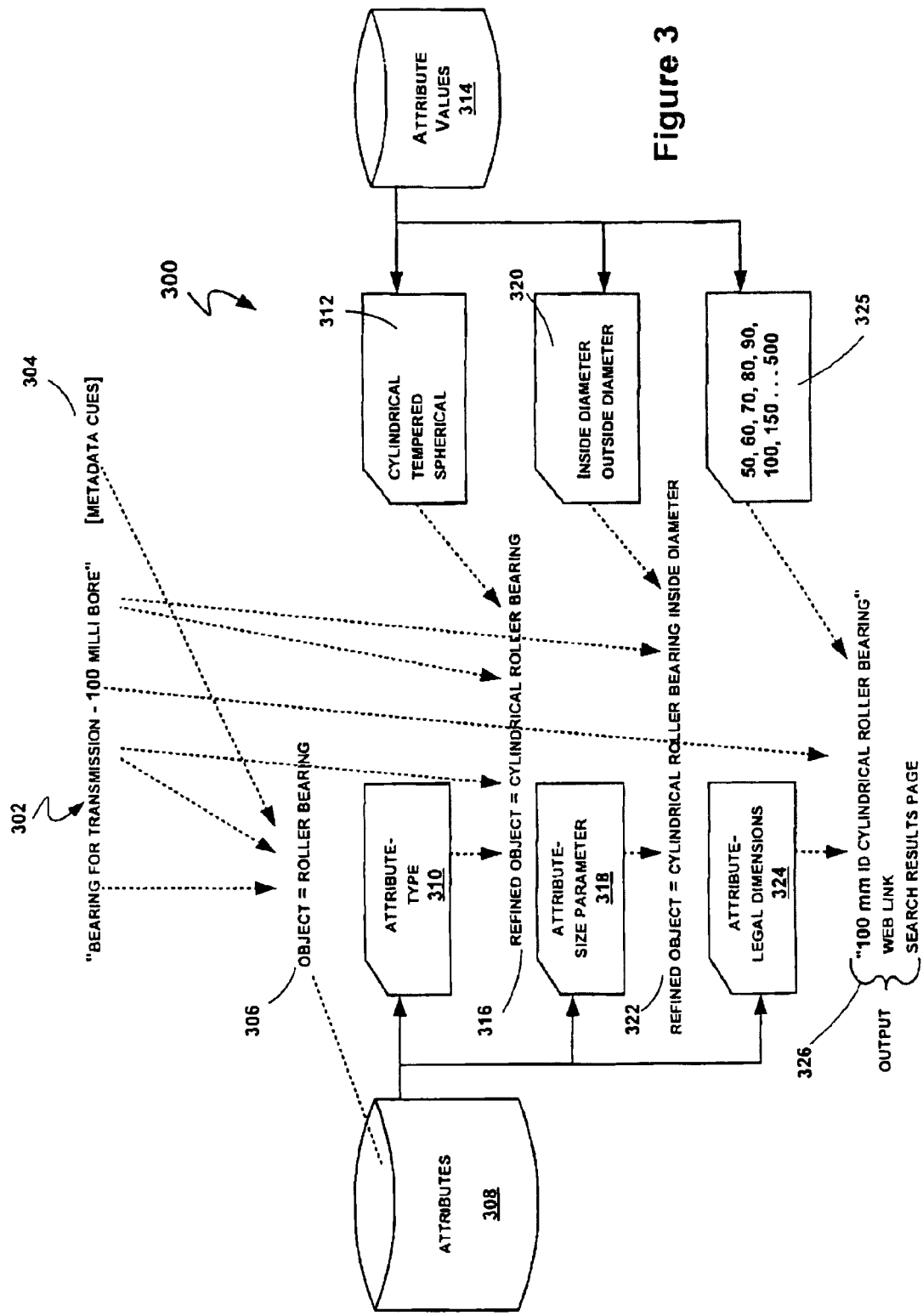
FIG. 3 is a schematic diagram showing an example of a conversion that may be implemented using the system of FIG. 1.

Referring to FIG. 3, a further example related to a frame-slot architecture 300 is illustrated. The architecture 300 is used to process a source string 302, in this case, "bearings for transmission-100 milli. bore." For example, this source string may be a record from a legacy information system or a search query. As discussed above, the processing of this source string 302 may utilize various contextual cues. As will be discussed in more detail below, such contextual cues may be derived from the content of the source string 302 itself. However, it is also noted that certain metadata cues 304 may be included in connection with the source string 302. In this regard, it is noted that legacy information systems such as databases may include a significant amount of structure that can be leveraged in accordance with the present invention. Such structure may be provided in the form of links of relational databases or similar tags or hooks that define data relationships. Such contextual information, which can vary substantially in form, is generally referred to herein as metadata.

The frame-slot architecture 300 is utilized to identify an object 306 from the source string 302. As noted above, this may involve identifying a term within the string 302 and comparing the term to a list of recognized objects or otherwise using logic to associate an input term with a recognized object. It will be noted in this regard that some degree of standardization or conversion which may involve the use contextual information may be performed in this regard. Thus, in the illustrated example, the identified object "roller bearing" does not literally correspond to any particular segment of the string 302. Rather, the object "roller bearing" is recognized from the term "bearing" from the string 302 together with contextual cues provided by the term "transmission" included within the content of the string 302 and, perhaps, from metadata cues 304. Other sources including external sources of information regarding bearings may be utilized in this regard by logic for matching the string 302 to the object 306.

Based on the object 306, information regarding attributes 308 and attribute values 314 may be accessed. As discussed above, such information may be derived from public and private schema. For example, an attribute type 310 may be identified for the object 306 and corresponding legal attribute values 312 may be determined. In this case, one attribute associated with the object "roller bearing" is "type" that has legal values of "cylindrical, tapered and spherical." The string 302 may be processed using this information to determine a refined object 316. In this case, the refined object is determined to be "cylindrical roller bearing." Again, it will be noted that this refined object 316 is not literally derived from the string 302 but rather, in the illustrated example, is determined based on certain contextual information and certain conversion processes. Thus, the string 302 is determined to match the attribute value "cylindrical" based on contextual information related to the terms "transmission" and "bore" included within the content of the source string 302. Information regarding the attributes 308 and attribute values 314 may again be accessed based on this refined object 316 to obtain further attributes 318 and associated attribute values 320. It should be noted that these attributes and attribute values 318 and 320, though illustrated as being dependent on the attribute 310 and attribute value 312 may alternatively be independent attributes and attribute values associated with the object 306. However, in the illustrated example, the attribute "size parameter" is associated with the legal values "inside diameter" and "outside diameter" based on the refined object "cylindrical roller bearings."

In this case, the attribute 318 and attribute value 320 are used together with certain contextual cues to define a further refined object 322. In this case, the further refined object 322 is defined as "cylindrical roller bearing inside diameter." A selection between the legal value "inside diameter" and "outside diameter" is made based on contextual information provided by the term "bore" included within the content of the string 302. Based on this further refined object 322, information regarding the attributes 308 and attribute values 314 can be used to identify a further attribute 324 and associated legal values 325. In this case, the attribute 324 is "legal dimensions" and associated legal values 325 are defined as "50, 60, 70, 80, 90, 100, 150 . . . 500." These values are assumed for the purposes of this example to be given in millimeters. In this case, the input string 302 is processed in view of the attribute 324 and legal values 325 to define an output 326 identified as "100 mm ID cylindrical roller bearings." In this regard, the string term "100 milli." is found to match the legal value of "100" for the attribute "legal dimensions" in the context of cylindrical roller bearings inside diameter. It will be appreciated that the term "milli." has thus been matched, based on a standardization or conversion process, to the designation "mm." It should be noted in this regard that success in matching the source term "100 milli." to the legal value "100 mm" provides further confidence was correctly and accurately performed.

Various types of outputs reflecting various conversion applications may be provided in this regard. Thus, in the case of converting an input file from a legacy database to an output form of a target information system, the input string 302 may be rewritten as "100 mm ID cylindrical roller bearing." In the case where the source string 302 represents a search query, the output may be provided by way of linking the user to an appropriate web page or including associated information in a search results page. It will be appreciated that other types of output may be provided in other conversion environments.

As noted above, the present invention may also implement a parse tree structure for conversion processes. Such conversion processes may relate, for example, to search systems or other information transformation systems as will be described below. Generally, such a search system may be operable in two modes: the set-up mode and the use mode. In the set-up mode, the user, who may be a subject matter expert or layman, performs a number of functions including accessing lists of potential search terms and/or source terms, developing a standardized set or set of terms, establishing a classification structure, associating the standardized terms with the classification structure and selectively transforming (e.g., translating) the terms as necessary.

Figure 7:
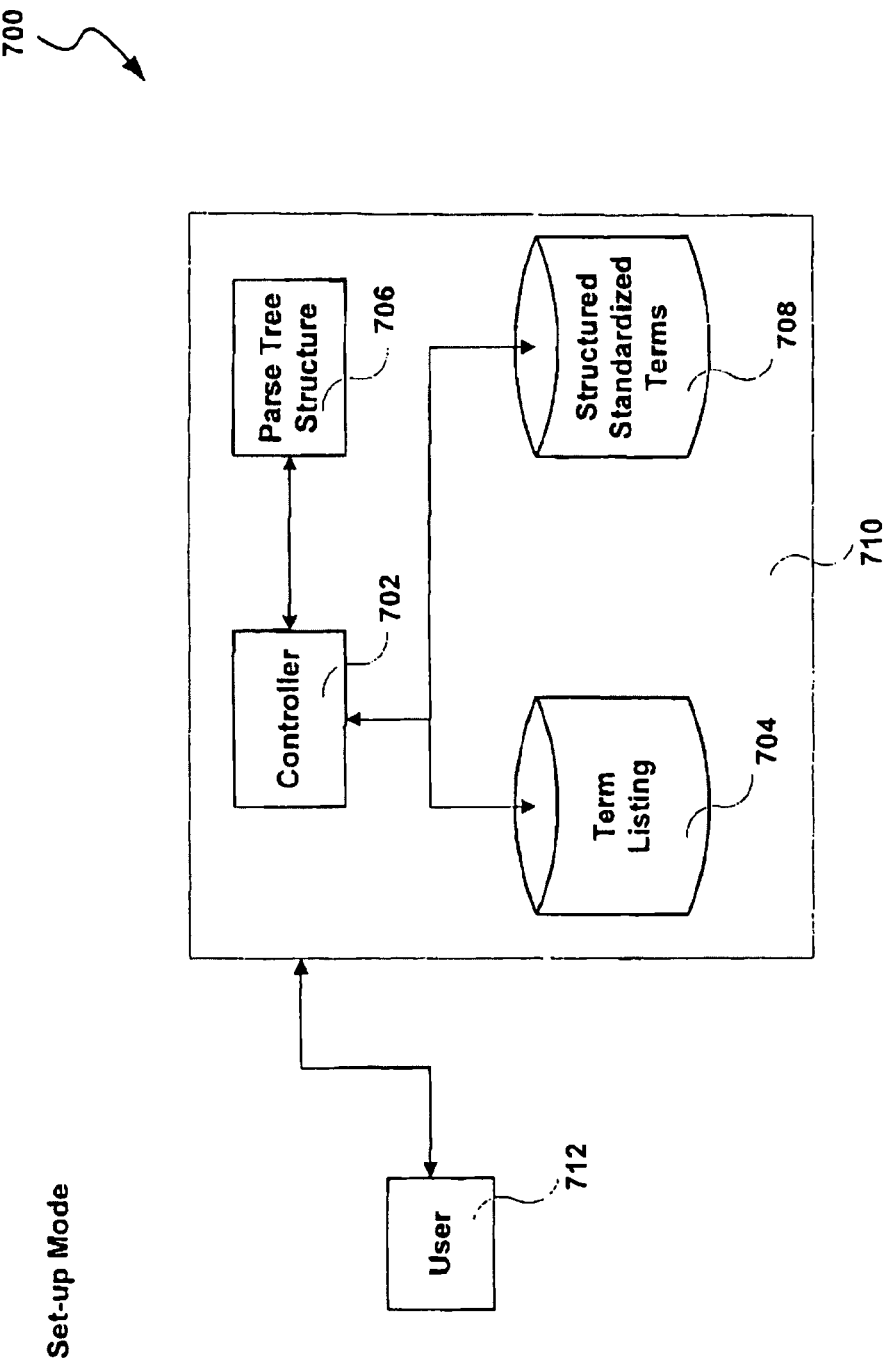
FIG. 7 is a schematic diagram illustrating set-up mode operation of a system in accordance with the present invention.

FIG. 7 is a schematic diagram of a search system 700, in accordance with the present invention, operating in the startup mode. Generally, the system 700 includes a controller 702 and storage configured to store a term listing 704, a parse tree structure 706 and a set of structured standardized terms 708. Although the system 3700 is illustrated as being implemented on a single platform 710, it will be appreciated that the functionality of the system 700 may be distributed over multiple platforms, for example, interconnected by a local or wide area network.

The user 712 uses the controller 702 to access a previously developed parse tree structure 706 or to develop the structure 706. In this regard, the parse tree structure 706 generally defines a number of classifications, each generally including one or more sub-classifications that collectively define the subject matter area. Examples will be provided below. The number of layers of classifications and sub-classifications will generally be determined by the user 712 and is dependent on the nature of the subject matter. In many cases, many such classifications will be available, for example, corresponding to headings and subheadings of a catalog or other pre-existing subdivisions of a subject matter of interest. In other cases, the subject matter expert may develop the classifications and sub-classifications based on an analysis of the subject matter.

The user can then use the controller 702 to access a term listing 704 to be processed. As noted above, such a term listing 704 may include potential search terms, source terms from a source data collection or both. In the case of potential search terms, the terms may be obtained from a pre-existing list or may be developed by the user 712. For example, the potential search terms may be drawn from a stored collection of search terms entered by users in the context of the subject matter of interest. Additional sources may be available, in a variety of contexts, for example, lists that have been developed in connection with administering a pay-per-click search engine. The list may be updated over time based on monitoring search requests. Similarly, the source term listing may be previously developed or may be developed by the user 712. For example, in the context of online shopping applications, the source listing may be drawn from an electronic product catalog or other product database.

After accessing the term listing, the user may perform a number of functions including standardization and classification. Standardization refers to mapping of terms from the term listing 704 to a second set, generally a smaller set, of standardized terms. In this manner, misspellings, abbreviations, colloquial terms, synonyms, different linguistic/syntax conventions of multiple legacy systems and other idiosyncratic matter can be addressed such that the list of standardized terms is substantially reduced in relation to the original term listing 704. It will be appreciated from the discussion below that such standardization facilitates execution of the searching functionality as well as transformation functions as may be desired in some contexts, e.g., translation.

The resulting list of standardized terms can then be mapped to the parse tree structure 706. As will be described below, this can be executed via a simple drag and drop operation on a graphical user interface. Thus, an item from a source listing, for example, identifying a particular Post-it note product, may be associated with an appropriate base level classification, for example, "Adhesive Notepad." Similarly, a term from a potential search term listing such as "Sticky Pad" may be associated with the same base level classification. It will be appreciated that a given term may be associated with more than one base level classification, a given base level classification may be associated with more than one parent classification, etc.

As noted above, such a base level classification may be associated with a parent classification, grandparent classification, etc. All of these relationships are inherited when the term under consideration is associated with a base level classification. The result is that the standardized term is associated with a string of classes and sub-classes of the parse tree structure 706. For example, these relationships may be reflected in an XML tag system or other metadata representation associated with the term. The resulting structured standardized terms are then stored in a storage structure such as a database.

Figure 8:
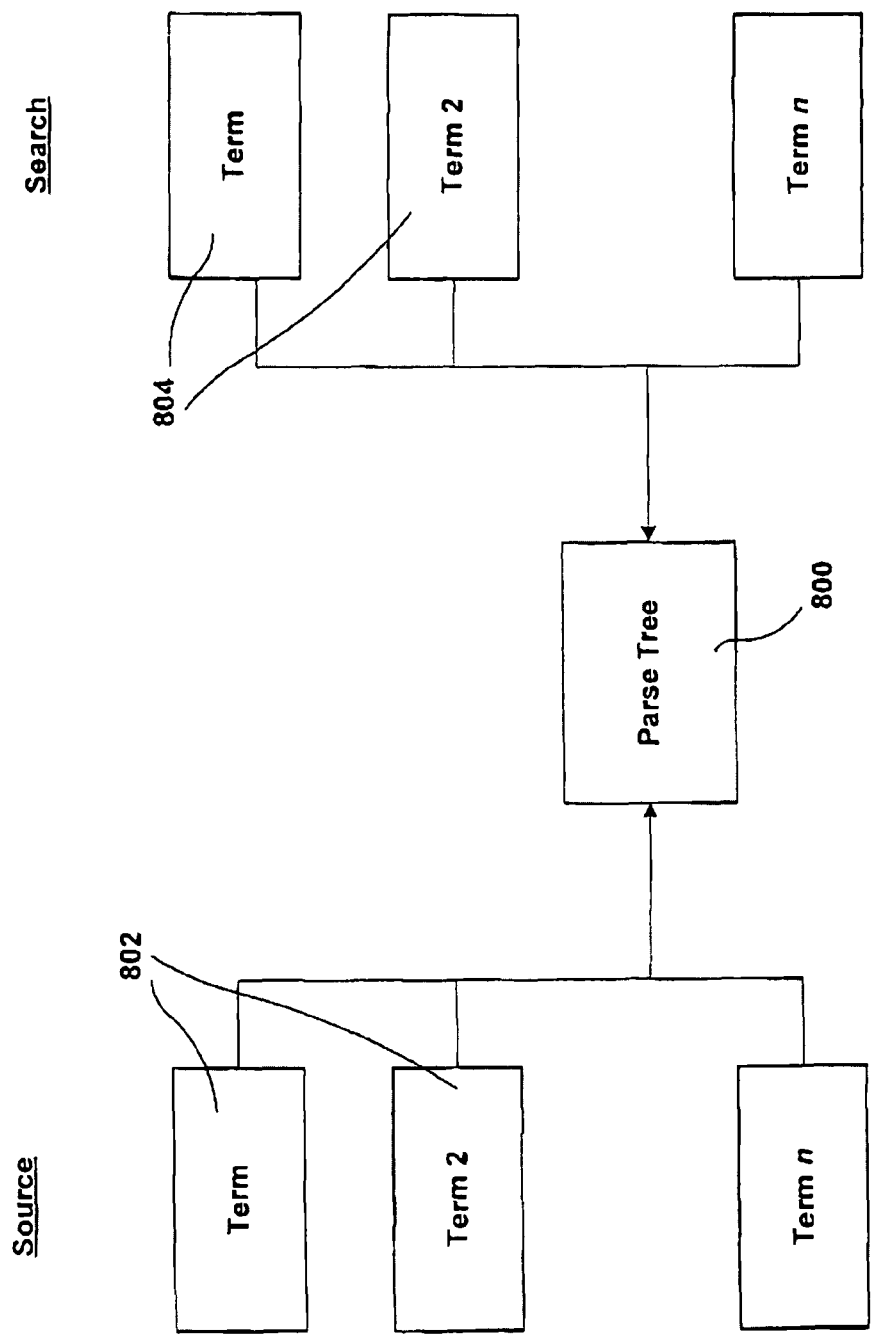
FIG. 8 is a schematic diagram illustrating a search application implemented in accordance with the present invention.

It will thus be appreciated that, in the illustrated embodiment, both source terms and potential search terms may be mapped to elements of the same parse tree structure. This is shown in FIG. 8. As shown, multiple terms 802 from the source collection are mapped to the parse tree structure 800. Similarly, multiple terms from the potential search term listing 804 are mapped to corresponding elements of the parse tree structure 800. In this manner, a particular search term entered by a user can be used to identify responsive information from the source collection based on a common classification or sub-classification despite the absence of any overlap between the entered search term and the corresponding items from the source collection. It will be appreciated that it may be desirable to link a given term 802 or 804 with more than one classification or classification lineage of the parse tree 800. This may have particular benefits in connection with matching a particular product or product category to multiple potential search strategies, e.g., mapping "pen" to searches including "writing instrument" or "office gift."

Figure 9:
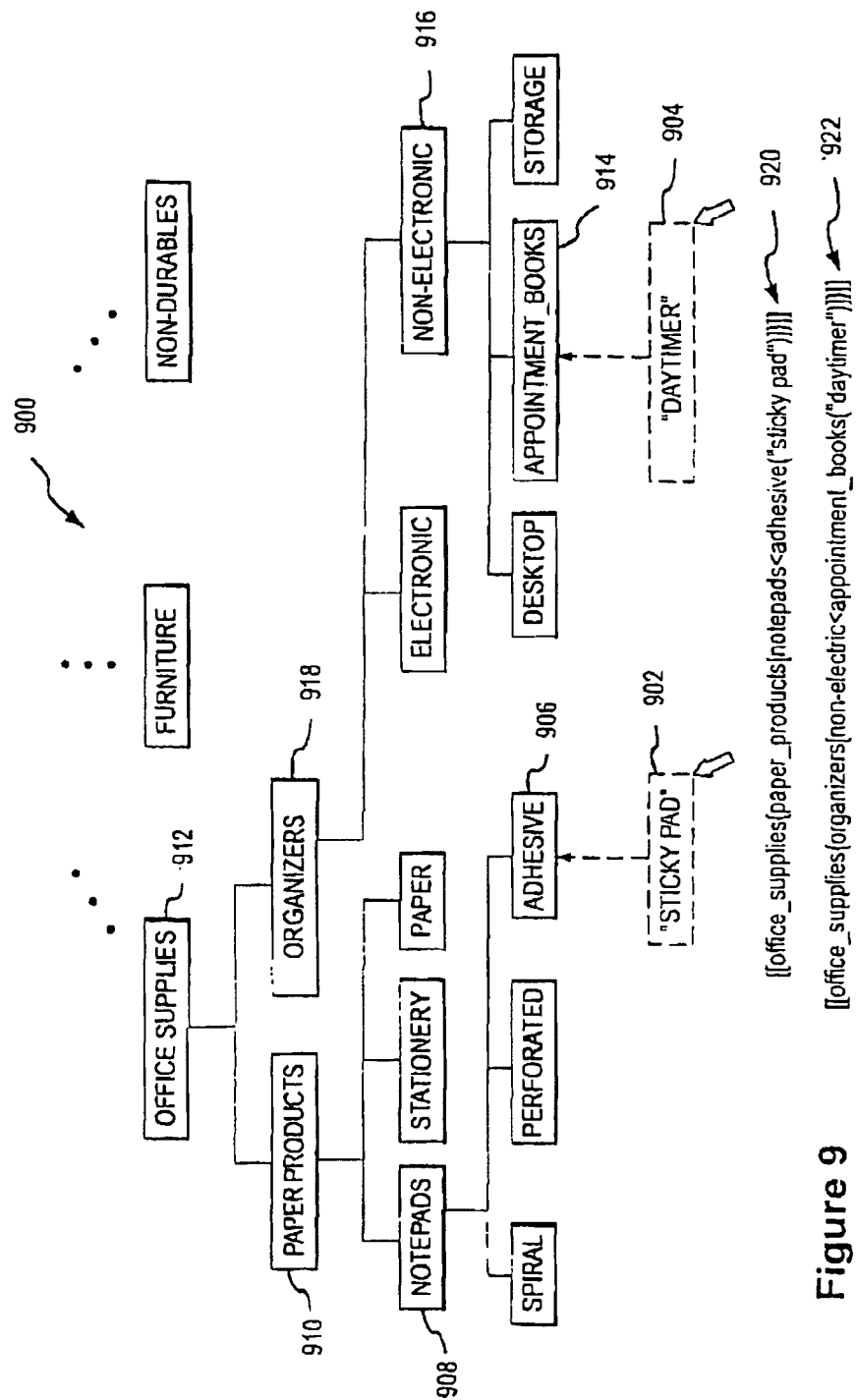
FIGS. 9 and 10 illustrate a classification system in accordance with the present invention.

An example of this process is shown in FIG. 9 with respect to particular search terms. In particular, FIG. 9 shows a user interface representing a portion of a parse tree 900 for a particular subject matter such as the electronic catalog of an office supply warehouse. In this case, the user uses the graphical user interface to establish an association between search terms 902 and 904 and the parse tree 900. Specifically, search term 902, in this case "sticky pad" is dragged and dropped on the node 906 of the parse tree 900 labeled "Adhesive." This node 906 or classification is a sub-classification of "Notepads" 908 which is a sub-classification of "Paper Products" 910 which, finally, is a sub-classification of "Office_Supplies" 912. Similarly, term 904, in this case "Daytimer," is associated with classification "Appointment_Books which is a sub-classification of "Non-electronic" 916 which, in turn, is a sub-classification of "Organizers" 918 which, finally, is a sub-classification of "Office_Supplies" 3912. Data strings 920 and 922 illustrate the resulting structured terms reflecting the classification relationships (other syntax, such as standard XML tag syntax, may be used to reflect the classification structure). It will be appreciated that the example of FIG. 9 omits the optional step of term standardization. That is, the potential search term "Sticky Pad" may alternatively first be mapped to a standardized term such as "Post-it note" before being associated with the parse tree. Such standardization will be described in more detail below.

Figure 10:
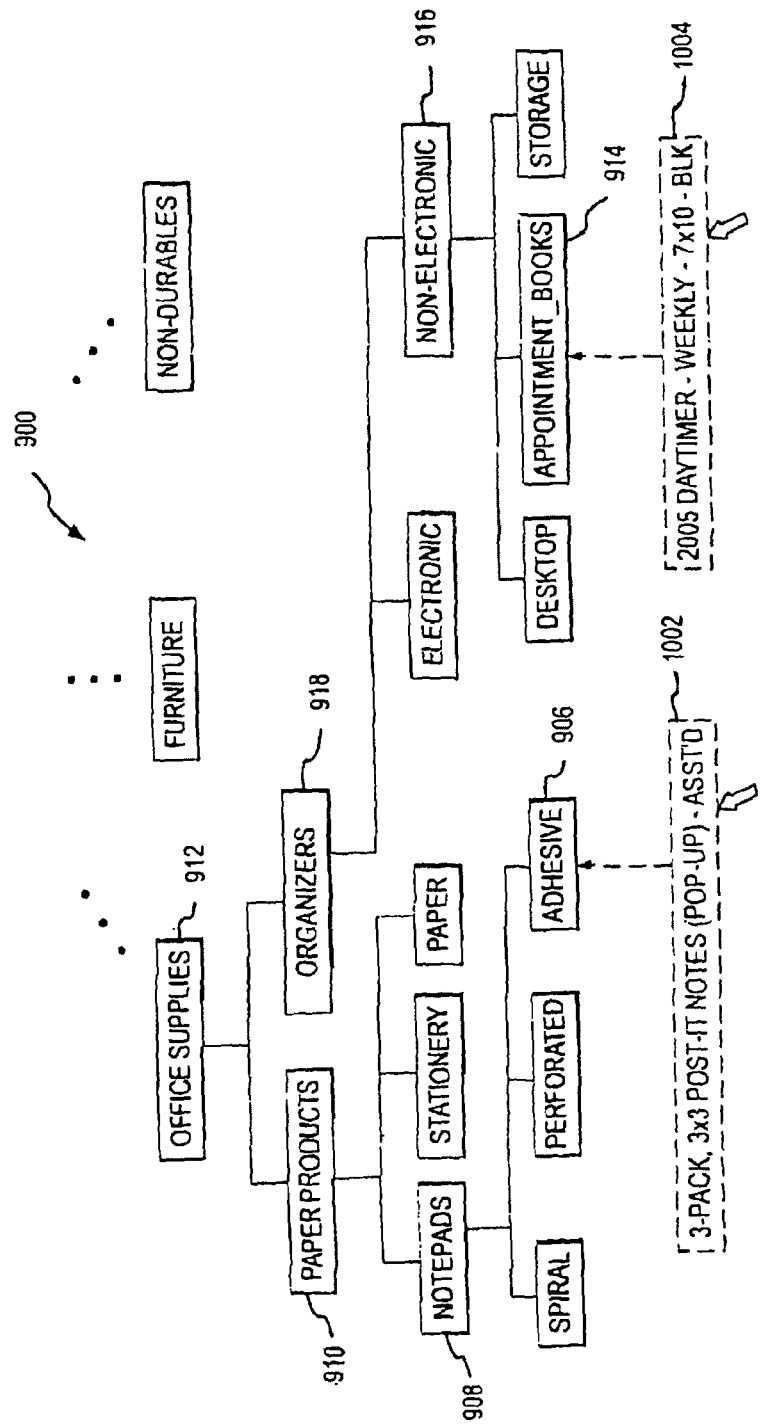

FIG. 10 illustrates how the same parse tree 900 may be used to associate a classification with items from a source collection. For example, such a source collection may be drawn from an electronic catalog or other database of the business. In this case, the source term 1002 denoted "3-pack, 3×3 Post-it notes (Pop-up)-Asst'd" is associated with the same node 906 as "Sticky Pad" was in the previous example. Similarly, term 1004 denoted "2005 Daytimer-Weekly-7×10-Blk" is associated with the same node 914 as potential search term "Daytimer" was in the previous example. As will be appreciated from the discussion below, such common associations with respect to the parse tree 900 facilitate searching.

Figure 11:
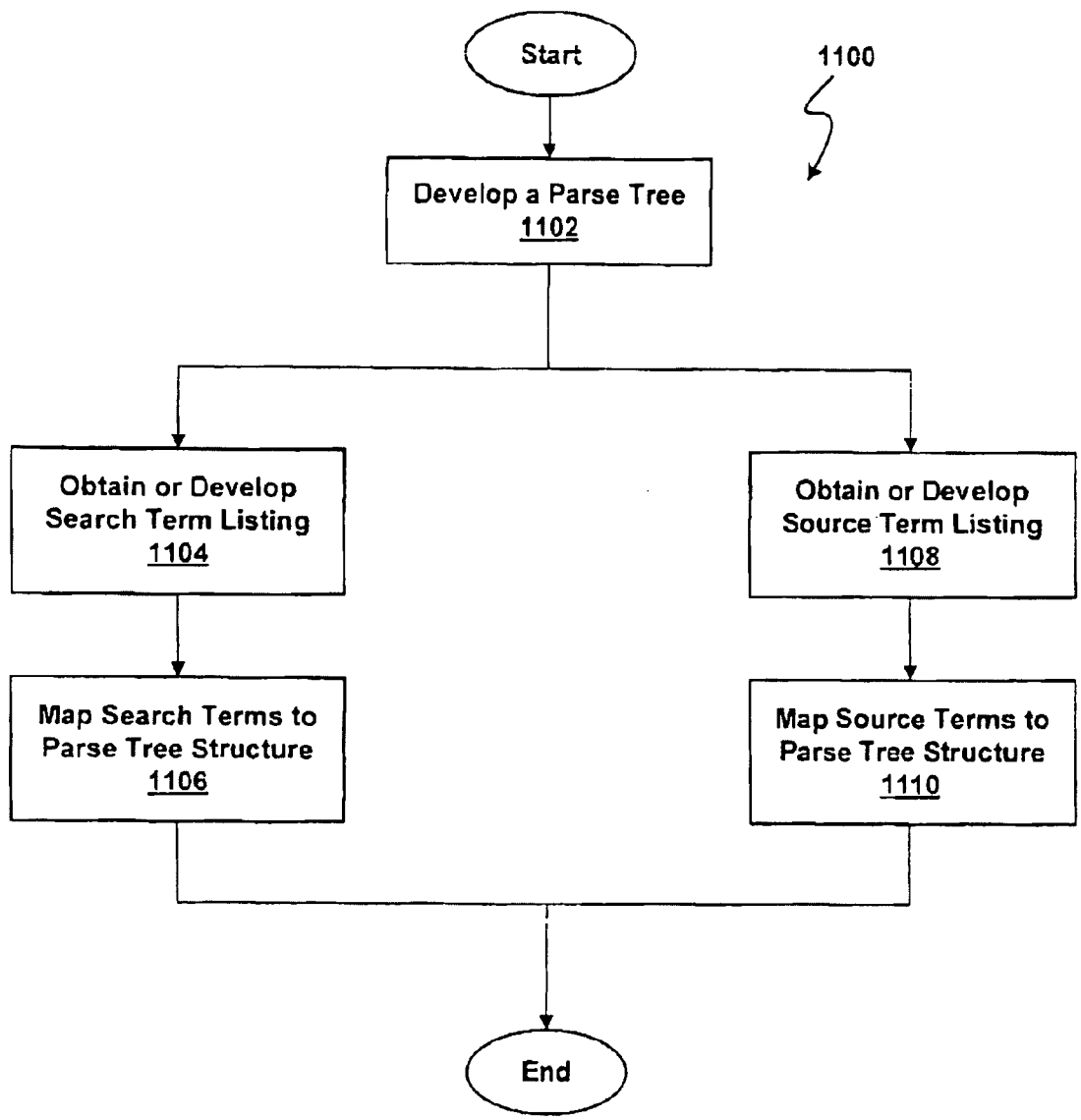
FIG. 11 is a flow chart illustrating a process for establishing a parse tree structure in accordance with the present invention.

This process for establishing a knowledge base may be summarized with respect to the flow chart of FIG. 11. The illustrated process 1100 is initiated by developing (1102) a parse tree that defines the subject matter of interest in terms of a number of classifications and sub-classifications. As noted above, such parsing of the subject matter may be implemented with enough levels to divide the subject matter to the desired granularity. The process 1100 then proceeds on two separate paths relating to establishing classifications for potential search terms and classifications for items from the source collection. It will be appreciated that these two paths may be executed in any order or concurrently. On the potential search term path, the process involves obtaining or developing (1104) a potential search term listing. As noted above, an existing list may be obtained, a new list may be developed by a subject matter expert, or some combination of these processes may occur. The terms are then mapped (1106) to the parse tree structure such as by a drag and drop operation on a graphical user interface as illustrated above. On the source term process line, the process 1100 proceeds by obtaining or developing (1108) a source term listing. Again, the source term listing may be obtained from existing sources, developed by subject matter expert or some combination of these processes may occur. The individual terms are then mapped (1110) to the parse tree structure, again, for example, by way of a drag and drop operation as illustrated above. Although not shown, the process 1100 may further include the steps of re-writing the potential search terms and source terms in a standardized form.

Figure 12:
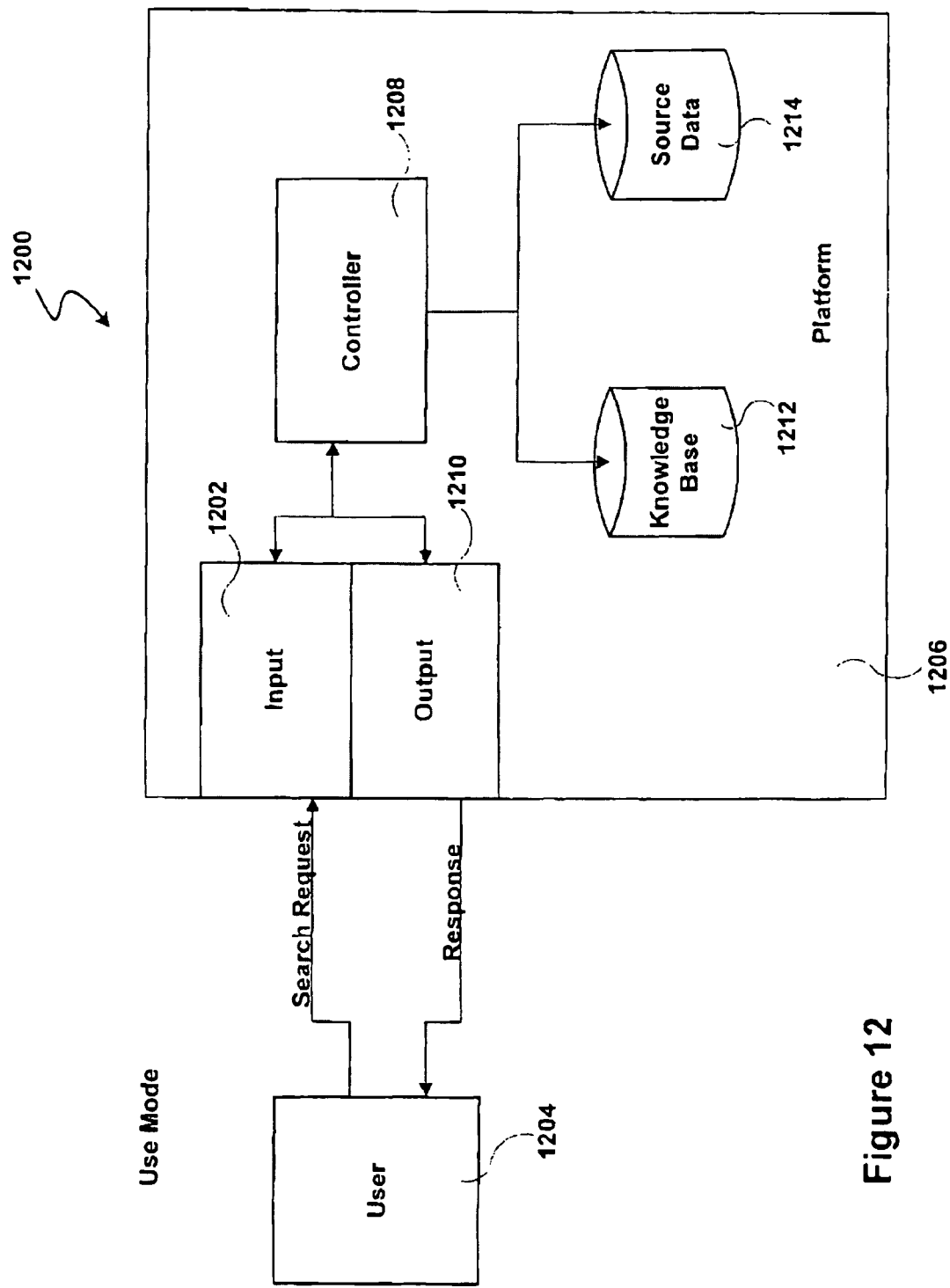
FIG. 12 is a schematic diagram illustrating a system for implementing a search application in accordance with the present invention.

The search system of the present invention is also operative in a use mode. This is illustrated in FIG. 12. The illustrated system 1200 includes input structure 1202 for receiving a search request from a user 1204. Depending on the specific network context in which the system 1200 is implemented, the search request may be entered directly at the machine executing the search system, or may be entered at a remote node interconnected to the platform 1206 via a local or wide area network. The nature of the input structure 1202 may vary accordingly. The search request is processed by a controller 1208 to obtain responsive information that is transmitted to the user 1204 via output structure 1210. Again, the nature of the output structure 1210 may vary depending on the specific network implementation.

In the illustrated implementation, in order to obtain the responsive information, the controller accesses the knowledge base 1212. The knowledge base 1212 includes stored information sufficient to identify a term from the search request, rewrite the term in a standardized form, transform the term if necessary, and obtain the metadata associated with the term that reflects the classification relationships of the term. The controller then uses the standardized term together with the classification information to access responsive information from the source data 1214.

Figure 13:
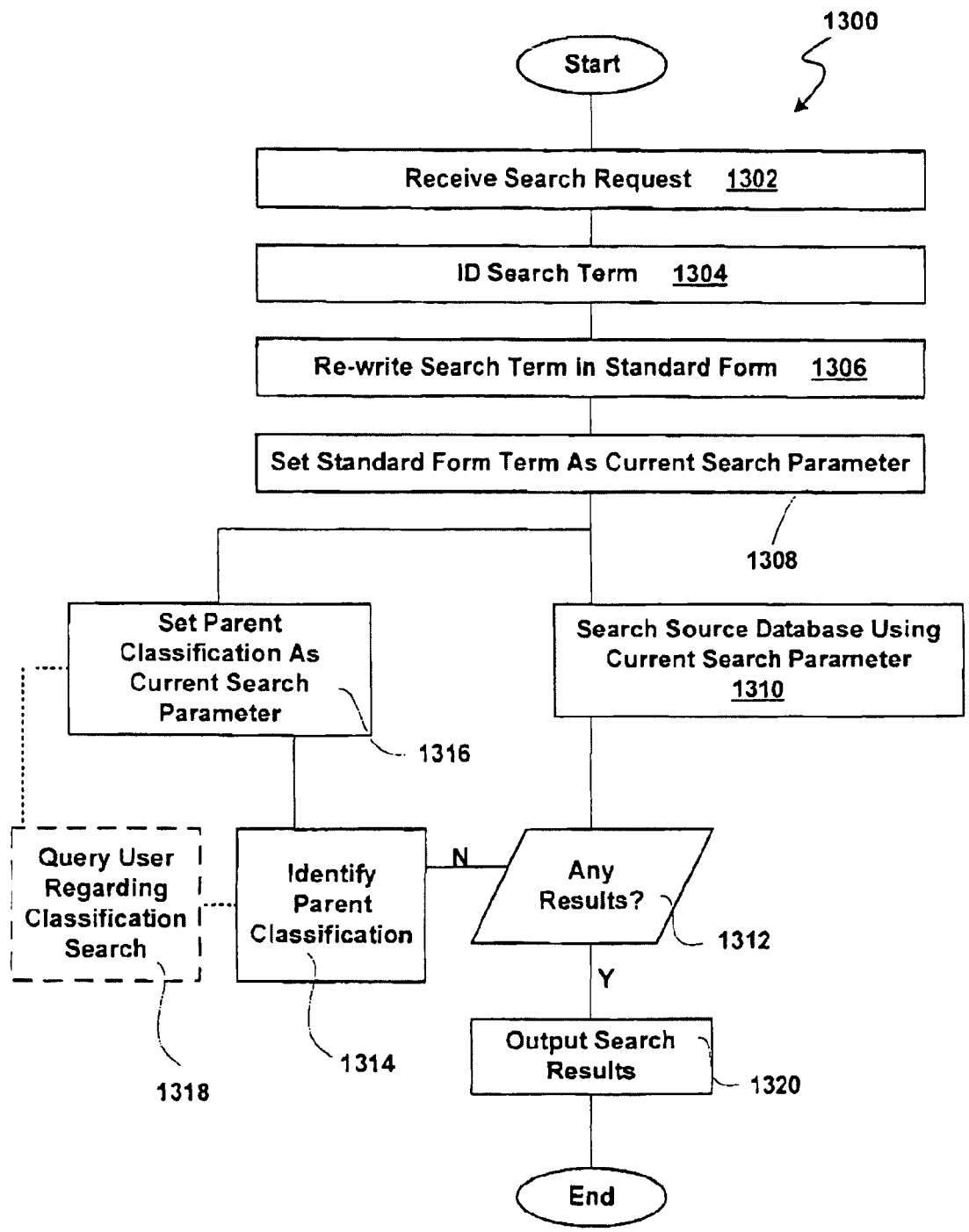
FIG. 13 is a flow chart illustrating a process that may be implemented by the system of FIG. 12.
Figure 14:
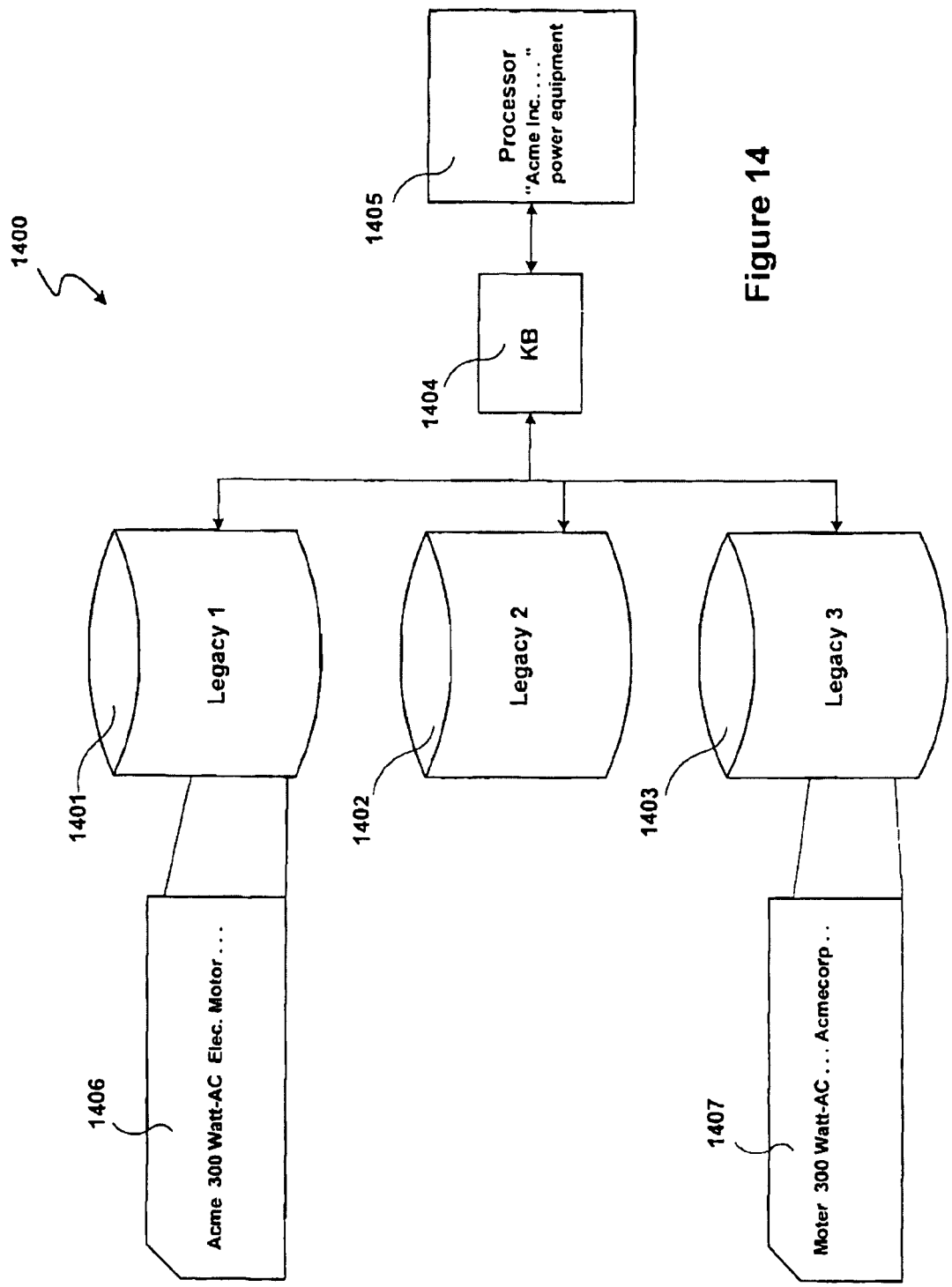
FIG. 14 is a schematic diagram illustrating a system using a knowledge base to process legacy information in accordance with the present invention.

FIG. 13 is a flow chart illustrating a corresponding process 14300. The process 100 is initiated by receiving (1302) a search request, for example, from a keyboard, graphical user interface or network port. The system is then operative to identify (1304) a search term from the search request. In this regard, any appropriate search query syntax may be supported. For example, a search term may be entered via a template including predefined Boolean operators or may be entered freeform. Existing technologies allow for identification of search terms thus entered.

The search term is then rewritten (1306) in standard form. This may involve correcting misspellings, mapping multiple synonyms to a selected standard term, implementing a predetermined syntax and grammar, etc., as will be described in more detail below. The resulting standard form term is then set (1308) as the current search parameter.

In the illustrated implementation, the search then proceeds iteratively through the hierarchy of the parse tree structure. Specifically, this is initiated by searching (1310) the source database using the current search parameter. If any results are obtained (1312) these results may be output (1320) to the user. If no results are obtained, the parent classification at the next level of the parse tree is identified (1314). That parent classification is then set (1316) as the current search parameter and the process is repeated. Optionally, the user may be queried (1318) regarding such a classification search. For example, the user may be prompted to answer a question such as "no match found—would you like to search for other products in the same classification?" In addition, the logic executed by the process controller may limit such searches to certain levels of the parse tree structure, e.g., no more than three parse levels (parent, grandparent, great grandparent) in order to avoid returning undesired results. Alternatively or additionally, such searching may be limited to a particular number of responsive items. The responsive items as presented to the user may be ordered or otherwise prioritized based on relevancy as determined in relation to proximity to the search term in the parse tree structure.

It will be appreciated that searching functionalities such as discussed above is not limited to searching of a web site or electronic catalog by outside parties but is more generally useful in a variety of searching and database merging environments. FIG. 44 illustrates a system 1400 for using a knowledge base 1404 to access information from multiple legacy databases 1401-1403. Many organizations have related information stored in a variety of legacy databases, for example, product databases and accounting databases. Those legacy databases may have been developed or populated by different individuals or otherwise include different conventions relating to linguistics and syntax.

In the illustrated example, a first record 1406 of a first legacy database 1401 reflects a particular convention for identifying a manufacturer ("Acme") and product ("300 W AC Elec.Motor . . . "). Record 1407 associated with another legacy database 1403 reflects a different convention including, among other things, a different identification of the manufacturer ("AcmeCorp") and a misspelling ("Moter").

In this case, an internal or external user can use the processor 1405 to enter a substantially freeform search request, in this case "Acme Inc. Power Equipment." For example, such a search request may be entered in the hopes of retrieving all relevant information from all of the legacy databases 1401-1403. This is accommodated, in the illustrated embodiment, by processing the search request using the knowledge base 1404. The knowledge base 1404 executes functionality as discussed above and in more detail below relating to standardizing terms, associating terms with a classification structure and the like. Thus, the knowledge base 1404 may first process the search query to standardize and/or classify the search terms. For example, Acme, Inc. may be associated with the standardized term "Acme." The term polar equipment may be associated with the standardized term or classification "motor." Each of these terms/classifications may in turn be associated with associated legacy forms of the databases 1401-1403 to retrieve responsive information from each of the databases. Additional conventional functionality such as merge functionality may be implemented to identify and prioritize the responsive information provided as search results to the processor 1405. In this manner, searching or merging of legacy data systems is accommodated with minimal additional code.

From the discussion above, it will be appreciated that substantial effort is involved in transforming data from one form to another, e.g., from a raw list of potential search or source terms to a set or sets of standardized, classified and, perhaps, translated terms. The present invention also accommodates sharing information established in developing a transformation model such as a semantic metadata model (SMM) used in this regard. Such sharing of information allows multiple users to be involved in creating the knowledge base, e.g., at the same time, and allows components of such information to be utilized in starting new knowledge base creation projects. This functionality is described in detail in U.S. patent application Ser. No. 10/970,372 which is incorporated herein by reference in its entirety.

2. Self-Learning Tool

As described above, the conversion process utilizes certain subject matter context reflected in a single record to assist in recognizing terms, making accurate conversions and identifying anomalies. This requires development of a substantial knowledge base regarding the subject matter context. For example, in the frame-slot architecture described above, elements of this knowledge base are reflected in the definition of the frames as well as the rules defining attributes and acceptable or required attribute values. However, in some cases, developing this knowledge base involves a significant time investment and subject matter cues may be difficult to extract from a string of text considered in isolation.

The self-learning tool can perform an analysis on training data including many files or strings of text so as to provide substantial automation of term and phrase recognition. This is described below in relation to an example involving a large collection of product descriptors all relating to antiperspirant (or deodorant). Such a data collection may be obtained, for example, from legacy data systems of a large retailer. It may be desired to simply recognize the descriptors, to match the descriptors to a search query, to re-write the descriptors in a more structured and standardized form into a master database, e.g., for improved inventorying and searching, or to perform other conversion processes.

In the following description, a specific implementation is described where some initial processing is performed, for example, using a system as described above, to identify records related to antiperspirant and to identify a subset of those records for use as training data. This provides some initial knowledge base information, for example, defining a parse tree and related frame-slot structure. Thereafter, statistical processing is performed on the training data to progressively supplement the knowledge base with statistical information. The resulting knowledge base can be used to convert new files and those new files can be used to update the statistical information of the knowledge base. Though the invention is described in this specific context, it will be appreciated that the invention can be employed in other conversion environments and can be implemented in other manners, including implementations where the data frame is not given but is inferred from the data.

In many cases, an entity such as a retailer can supply a large group of records including records related to the same subject matter (e.g., antiperspirant items) as well as other items. Such records may be collected from a variety of legacy data systems and, typically, are not standardized with regard to abbreviations, syntax and the like used to describe the products. In some cases, such an entity may have some amount of records that are standardized. For example, one of the legacy systems may have data that is fully attributed and internally consistent with respect to abbreviations, syntax and the like. Alternatively, with minimal training, a system as described above may be able to process the records from the legacy systems so as to recognize and standardize some number of those records.

In one exemplary case, an entity provided over 63,000 records of non-standardized deodorant items together with records for other types of items. In addition, the system of the present invention received about 2,500 records of deodorant items that were fully attributed and standardized. A sampling of such records is shown in FIG. 15. As shown, each record includes a number of attributes and all required attribute values are populated with standardized information. FIG. 16 shows a user interface screen reflecting an associated parse tree segment for these products developed from the standardized data. The parse tree structure generally corresponds to that described above in the first section of this detailed description. The system as described above has been found to be quite successful in identifying the non-standardized records. In this case, such a system was effective in identifying over 58,000 of the non-standardized records as antiperspirant products. This results in significant efficiencies in relation to prior art systems. However, over 5,000 antiperspirant records were not recognized and some records not associated with antiperspirant products were misidentified. It will be appreciated that those unrecognized and misidentified records could be addressed by an operator through a process of manually addressing the records or developing additional rules to recognize additional records. However, this process involves significant effort and therefore involves additional time and expense.

The difficulties presented by these non-standardized product descriptors is illustrated by the following exemplary deodorant product descriptor: OS RD ZN SPRT 2.6Z. It will be appreciated that it is difficult for the system described above to parse this record into identifiable terms. Indeed, the data is so complex that the system described above may have using any surrounding context within the record for guidance. However, it has been found that such seemingly intractable files may be more readily resolved when the consideration of subject matter context is expanded from a single file to include multiple files. FIG. 17 illustrates a set of related files. Upon consideration of such a set of files, a human observer can recognize many terms that are not readily recognized when an individual file is considered in isolation.

The invention as described below provides similar capabilities to a machine tool. Specifically, by analyzing a larger set of data, the tool is able to recognize individual terms and phrases that would be difficult or substantially impossible to recognize based on consideration of a single record. In particular, the system described below automates acquisition of terms and phrases. With regard to terms, the system can predictively (without reference to pre-established rules) match a new term to a standardized term that has been defined by an existing rule or automatically based on analysis of a sample data set. Similarly, phases can be identified in input records and associated with existing ontologics.

Figure 18:
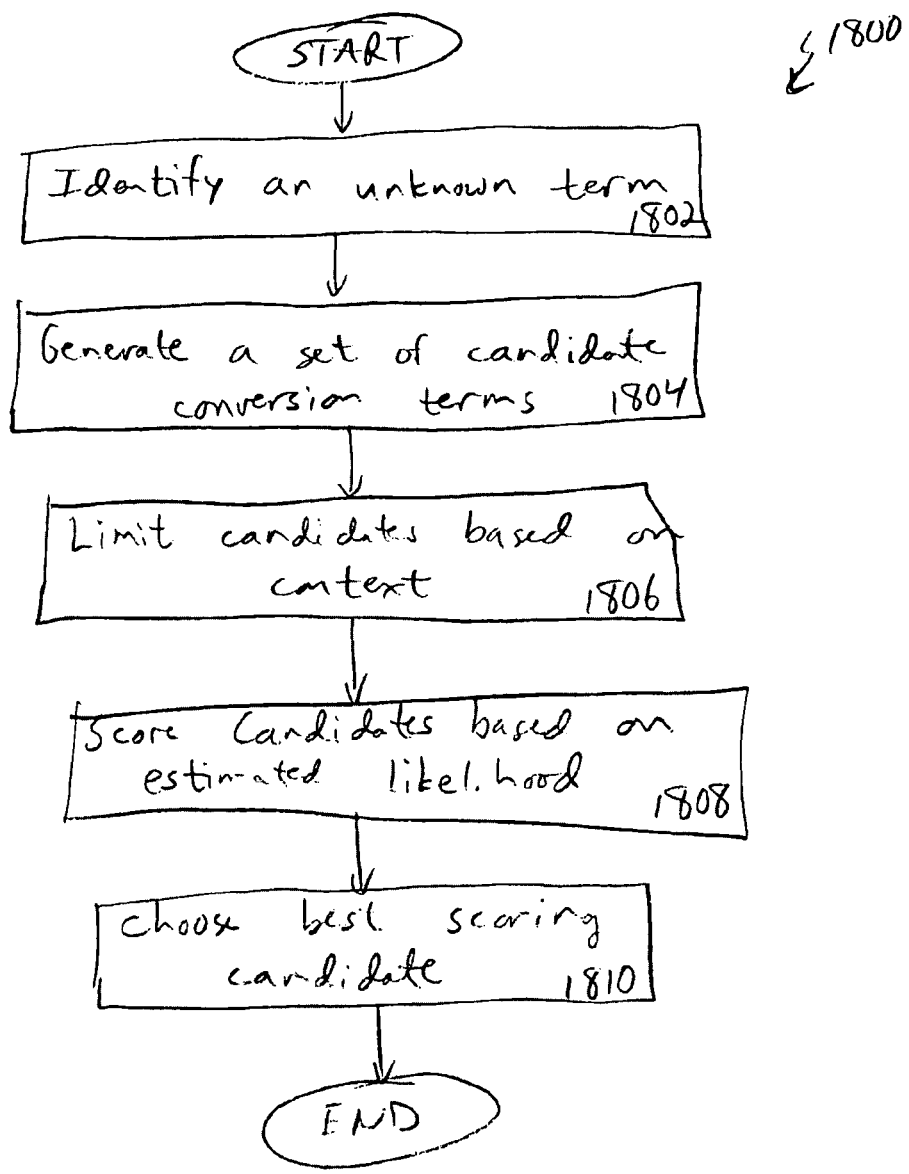
FIG. 18 is a flow chart illustrating a process for converting an input data string in accordance with the present invention.

The general form of the process 1800 is illustrated in FIG. 18. The process is initiated by identifying (1802) an unknown term. Specifically, an input string such as a product descriptor file is parsed as described above. Individual terms are then analyzed using existing rules for matching input terms to standardized full forms. Thus, if a particular abbreviation is already known (e.g., "oz." Means "ounce"), that abbreviation can be mapped directly to the standardized full form. In this manner, one or more terms of the input sting may be determined. Any remaining terms are identified as unknown terms subject to further processing in accordance with the illustrated process 1800.

For a given unknown term, a set of candidate conversion terms is then generated (1804). In this regard, an orthographic transformation algorithm can be utilized to compare the unknown term to known terms in a dictionary. This type of algorithm is well-known and is used, for example, in connection with search engines and spell check functions of word processing systems. Generally, such algorithms identify potential matches to a term under consideration and associated probabilities by the number and magnitude of changes required to complete a transformation between the term under consideration and a given candidate term from the dictionary. For example, a term from the dictionary that differed from the term under consideration by only one letter may be deemed as a more likely match than a term from the dictionary that differed from the term under consideration by two letters. Such dictionaries employ a variety of rules to address missing letters and common abbreviations and transformations.

If no information is available regarding the context of the unknown term, a general dictionary or the most general dictionary applicable to the conversion process may be used to generate the set of candidate conversion terms. However, in accordance with the present invention, such an algorithm may be tailored to the conversion process. For example, the dictionaries as well as the rules for rating the probabilities of the transformation may be application specific. Thus, as noted above, in many cases the unknown term may be part of an input string that includes a number of recognized terms. Moreover, in some cases, the subject matter context of the unknown term may be provided by a user. In such cases, the candidate conversion terms may be generated from a dictionary specific to that subject matter context. For example, if the frame of the data has been given or inferred, the candidate terms may be generated from a dictionary specific to that frame. Moreover, statistical information obtained by analysis of sample data may be used in establishing probabilities for the transformations.

It will thus be appreciated that the candidate terms, as generated, may be limited based on some subject matter information. However, the candidates may be further limited (1806) based on a variety of additional context information. For example, if the term under consideration is part of an input string including known terms, those known terms can be used to identify likely patterns. Thus, if an item has been identified from the input string, then a list of attributes corresponding to that item may be available. By analyzing the input string, missing attributes can be identified as likely candidates. Similarly, based on known rules of a frame-slot architecture, it may be determined that the term under consideration is associated with a valid attribute value. That association may provide a cue that serves to limit the candidates for the term under consideration.

The remaining candidates can then be scored (1808) based on an estimated likelihood for each candidate that it corresponds to the term under consideration. In one implementation, this is based on a statistical analysis. A variety of information relevant to a statistical analysis may be available. For example, as noted above, the orthographic transformation algorithm may yield probability information related to the number and magnitude of changes required in connection with a transformation between the term under consideration and a dictionary term. This provides transformation probability information.

In addition, various items of evidence can be inferred from the subject matter context that impact such a statistical analysis. For example, a set of sample data may be analyzed to obtain information regarding the frequency of occurrence of different terms. This analysis may be based on the full set of sample data or on a subset of sample data corresponding to a known or inferred frame of the input string. Candidate terms associated with a higher frequency of occurrence within the relevant data set would generally be attributed a higher probability in this regard. It will be appreciated that such frequency information may be updated as unknown terms are recognized.

In addition, the probability associated with a candidate term may be affected by the context of the input string. Thus, if a product or item of the input string has been identified, and that product or item is associated with a known set of attributes, a candidate term associated with those attributes may be assigned a higher probability. Similarly, if the candidate term is associated with an attribute missing from the input string, the probability associated with that candidate term will generally increase. Conversely, if an attribute has already been identified in the input string, an associated candidate term may be eliminated or its probability decreased.

Moreover, the probability associated with a candidate term may be affected by a pattern matching analysis. For example, a syntax analysis may indicate that antiperspirant product descriptors frequently include a product name at or near the start of a descriptor or frequently include a size attribute at or near the end of the product descriptor (similarly, the dimensions of a flat bar, as discussed above, may typically be given by the sequence length, then width, then thickness). In this regard, the position of the term under consideration in relation to the input string or in relation to previously recognized attributes or attribute values may have an impact on the probability values. It will thus be appreciated that a variety of types of information, which will vary from application to application, may be available for statistical analysis.

Any suitable statistical analysis for generating a probability score based on the available statistical information may be utilized. In a preferred implementation, a Bayesian algorithm or Markov chain algorithm is employed. Generally, these techniques progressively update an estimated probability based on a series of pieces of evidence or observations. Specifically, the form of a Bayesian inference process in this context may be as follows:

$$P(V_0|V,\text{frame})=P(V|V_0,\text{frame})P(V_0,\text{frame})/P(V,\text{frame})$$

In this regard, the posterior probability $P(V_0|V)$ may be directly computed. Alternatively, since $P(V)$ is constant over all candidates, the value of $P(V|V_0)P(V_0)$ can be used to score the candidates. More particularly, the term $P(V|V_0)$ can be estimated by modeling the relationship between the candidate term and the term under consideration as a sequence of orthographic changes, as discussed above. In a preferred implementation, the probabilities associated with these orthographic transformations are learned from analysis of other data such as a set of sample data.

The probability associated with the term $P(V_0)$ may be estimated from contextual information, as discussed above, such as the frequency of occurrence of the candidate term in the sample data. It will thus be appreciated that a variety of information may be relevant to the statistical analysis. Each item of such information can be processed as a piece of evidence or observation in the noted Bayesian inference process. Each piece of evidence will have an impact on the prior or existing probability. This process continues until all relevant evidence has been processed. At the conclusion of this process, the final, posterior probability value may be used as the probability score for that candidate term. This process is executed for each of the candidate terms such that a probability score is obtained for all candidates. The best scoring candidate is then chosen (1810) for the conversion process.

Although the above discussion assumed that the statistical analysis was being conducted on a term-by-term basis, it will be appreciated that the analysis may be conducted for phrases or other chunks of input data. Similar orthographic transformation probability information and context probability information such as pattern recognition information can be utilized to score candidates and select the best scoring candidate.

Moreover, as one term in an input string is recognized, that term may have an impact on the analysis of another unknown term of that input string. Accordingly, probabilities may be adjusted and processes may be performed iteratively to simultaneously resolve multiple unknown terms. Similarly, as syntax and spelling may vary simultaneously, multi-dimensional pattern recognition may be implemented. Thus, it will be appreciated that the process may be nonlinear in various respects.

It will be appreciated that user feedback may be used to improve confidence in the system. Thus, for example, as the statistical process recognizes individual terms, phrases or full records, those items may be flagged for review by a user. The user can verify the accuracy of those terms and report errors. This information can be used by the statistical analysis tool to update probability values. Generally, the statistical process may either be pulled, i.e., requested by a user, or pushed, i.e., automatically executed.

Figure 19:
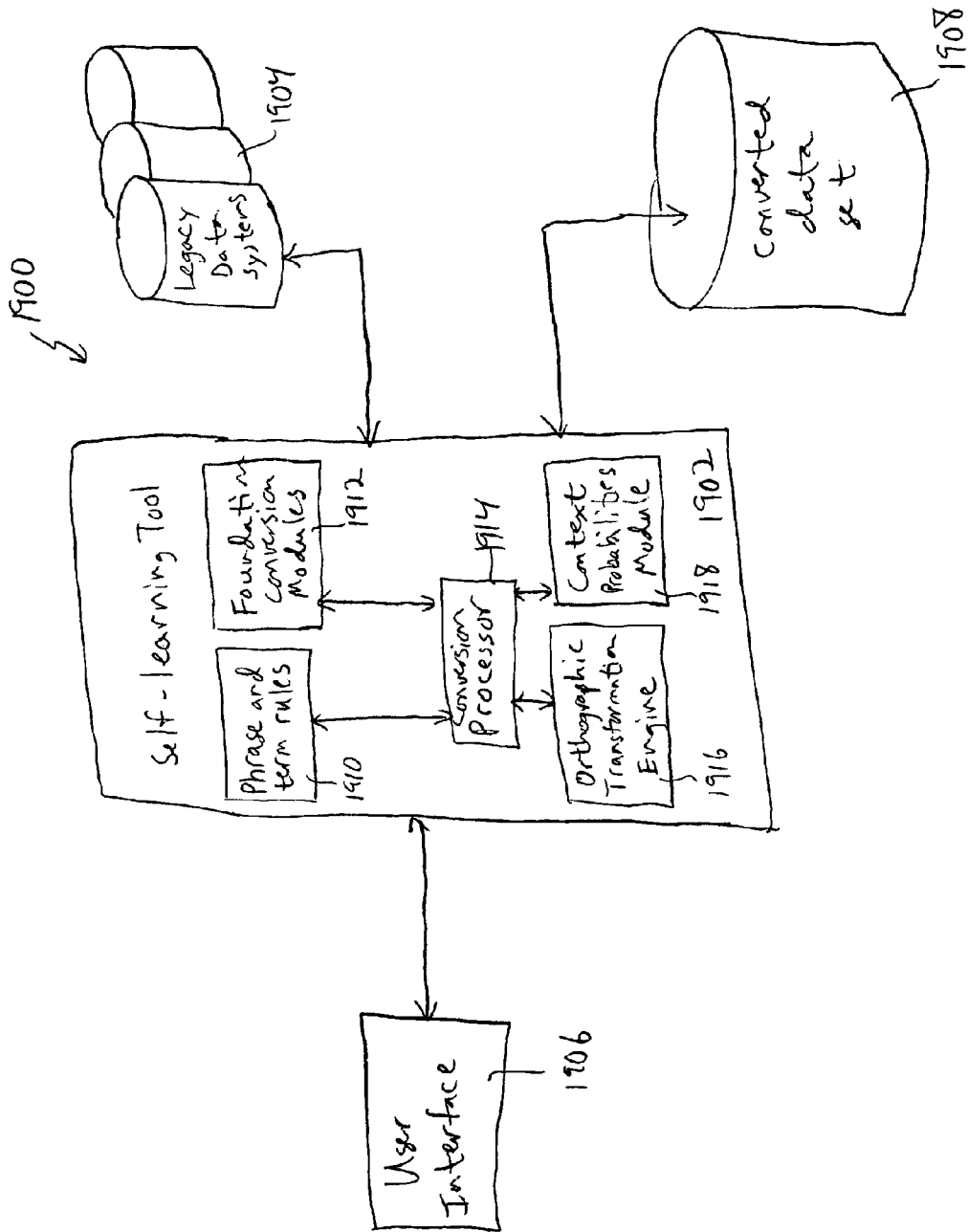
FIG. 19 is a block diagram of a self-learning conversion tool in accordance with the present invention.

FIG. 19 shows a schematic diagram of a conversion system 1900 in accordance with the present invention. The conversion system 1900 includes a self-learning tool 1902 having functionality as described above. The self-learning tool 1902 receives input files from legacy data systems 1904. This input information may include, for example, product descriptors and, perhaps, a set of fully attributed and normalized sample data. A user can interact with the self-learning tool 1902 via the user interface 1906. In this manner, the user can define rules, identify existing conversion modules for reuse and enter other appropriate commands. The output from the self-learning tool 1902 in the illustrated embodiment is a converted data set 1908. For example, the converted data set may be fully attributed and normalized data corresponding to the full content of the legacy data systems 1904. It will be appreciated that, in certain conversion processes, such a converted data set 1908 may be an intermediate form in the conversion process. For example, it may ultimately be desired to map the converted data set 1908 to a further data base or match individual items of converted data to a search query or the like. In such cases, the converted data set 1908 may be a useful intermediate form.

The illustrated self-learning tool 1902 includes a conversion processor 1914 for executing conversion logic as described above. The conversion processor 1914 can access a set of phrase and term rules 1910. For example, these phrase and term rules 1910 may define a parse tree structure, frame-slot architecture and other conversion rules developed for a specific conversion application or having more general applicability.

The conversion processor 1914 can also access certain foundation conversion modules 1912. As noted above, some conversion rules may have application beyond a single conversion process and can be reused in subsequent conversion applications. For example, a variety of standard abbreviations may be defined for weights, measures and other attributes. Such rules may be included in the foundation conversion modules 1912.

The illustrated self-learning tool 1902 further includes an orthographic transformation engine 1916. As discussed above, such an engine may execute algorithms for matching a term under consideration to a number of candidate conversion terms. In addition, the engine may associate probabilities with each such candidate conversion term based, for example, on the number and magnitude of changes required to accomplish the transformation. As discussed above, such algorithms may be general algorithms or may be tailored to the specific conversion process. The engine 1916 can be accessed by the conversion processor 1914 so as to obtain probability information for use in the statistical analysis.

Additional statistical information is provided by the context probability module 1918. As discussed above, a set of sample data can be analyzed to obtain a variety of statistical information related to frequency of term usage, patterns of term usage, phrasing ontologies and the like. The conversion processor 1914 can access such information to perform the statistical analysis.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A method for use in converting semantic information from a source form to a target form, comprising the steps of:
   obtaining an input string comprising a portion of the semantic information for conversion from said source form to said target form;
   first identifying a source term of said input string for conversion, wherein a context of said source term is ambiguous;
   second identifying a plurality of potential subject matter contexts of said input string including a plurality of different usage contexts for said source term in said source form from a portion of the semantic information other than said input string, wherein said plurality of different usage contexts represent identified potential usage contexts of said contextually ambiguous source term that are identified from said semantic information other than said input string in said source form of said semantic information;
   based on said plurality of subject matter contexts, establishing a set of at least two alternative candidate conversion terms in said target form for said source term, wherein said alternative candidate conversion terms comprise different possible representations of said contextually ambiguous source term in said target form corresponding to different ones of said plurality of different potential usage contexts;
   performing, using a computer based system, a statistical analysis at least partially based on said plurality of different usage contexts corresponding to said alternative candidate conversion terms, said statistical analysis including establishing a statistical probability for each of said alternative candidate conversion terms and selecting a selected one of said alternative candidate conversion terms having a highest probability of corresponding to a correct usage context of the source term in said string; and
   using said selected one of said alternative conversion terms to convert said source term from said source form to said target form.

2. The method as set forth in claim 1, wherein said input string comprises unstructured semantic information.

3. The method as set forth in claim 1, wherein said input string comprises data structured in accordance with a source data structure.

4. The method as set forth in claim 1, wherein said step of obtaining comprises receiving a search string entered into a search tool.

5. The method as set forth in claim 1, wherein said search string is substantially in a free speech form.

6. The method as set forth in claim 1, wherein said step of obtaining comprises accessing stored data of a legacy data system.

7. The method as set forth in claim 1, wherein said step of first identifying comprises applying logic to parse said input string into cognizable units and selecting one or more of said units as said source term.

8. The method as set forth in claim 7, wherein said logic selects said source term based on identifying a frame of said input string and identifying a missing attribute or attribute value in relation to said input string.

9. The method as set forth in claim 1, wherein said step of second identifying is executed before said step of first identifying.

10. The method as set forth in claim 1, wherein said step of second identifying comprises inferring said plurality of usage contexts from analysis of said semantic information.

11. The method as set forth in claim 1, wherein said step of second identifying comprises determining said plurality of usage contexts from analyzing metadata associated with said input string describing a semantic information content of said input string.

12. The method as set forth in claim 1, wherein said step of second identifying comprises performing an analysis of other data from an input source of said input string.

13. The method as set forth in claim 1, wherein said step of second identifying comprises receiving a user input indicating said subject matter context including said plurality of usage contexts.

14. The method as set forth in claim 1, wherein said step of establishing comprises accessing a master set of conversion terms and using a linguistic comparison tool to select first alternative candidate conversion terms from said master set of conversion terms.

15. The method as set forth in claim 14, wherein said master set of conversion terms is obtained at least in part from a standardized listing compiled for said subject matter context corresponding to said plurality of usage contexts.

16. The method as set forth in claim 14, wherein said master set of conversion terms is obtained based on analysis of other data from an input source of said input string.

17. The method as set forth in claim 14, wherein said step of establishing comprises eliminating at least one of said first alternative candidate conversion terms to establish said set of alternative candidate conversion terms.

18. The method as set forth in claim 17, wherein said step of eliminating comprise determining that at least one eliminated alternative candidate conversion term is an incorrect conversion term based on a contextual cue.

19. The method as set forth in claim 18, wherein said contextual cue is based on a classification taxonomy structure of said subject matter context corresponding to a usage context of the eliminated candidate conversion term.

20. The method as set forth in claim 18, wherein said contextual cue comprises a rule of a frame-slot structure.

21. The method as set forth in claim 20, wherein said rule defines acceptable values of an attribute associated with said input string.

22. The method as set forth in claim 1, wherein said establishing a probability comprises determining said probability based on an analysis of successive pieces of evidence for each alternative candidate term.

23. The method as set forth in claim 22, wherein at least one of said successive pieces of evidence relates to, for a given alternative candidate conversion term, an occurrence of an associated term in said input string.

24. The method as set forth in claim 1, wherein said establishing a statistical probability involves, for a given alternative candidate term, determining a frequency of occurrence of said given alternative candidate term in a set of sample data.

25. The method as set forth in claim 1, wherein said target form is different than said selected alternative candidate term.

* * * * *

UNITED STATES PATENT AND TRADEMARK OFFICE
CERTIFICATE OF CORRECTION

| | | |
|---|---|---|
| PATENT NO. | : 9,043,367 B2 | Page 1 of 1 |
| APPLICATION NO. | : 12/126760 | |
| DATED | : May 26, 2015 | |
| INVENTOR(S) | : Green et al. | |

It is certified that error appears in the above-identified patent and that said Letters Patent is hereby corrected as shown below:

In drawings,

On sheet 19 of 20, in figure 18, under Reference Numeral 1808, line 2, delete "likelhood" and insert -- likelihood --, therefor.

In specification,

In column 4, line 4, delete "slot-represents" and insert -- slot represents --, therefor.

In column 12, line 28, delete "FIG. 6B" and insert -- FIG. 6B. --, therefor.

In column 12, line 36, delete "12" /1;16"" and insert -- 12" 1/16" --, therefor.

In column 16, line 36, delete ""Appointment_Books" and insert -- "Appointment_Books" --, therefor.

Signed and Sealed this
Sixteenth Day of February, 2016

Michelle K. Lee
*Director of the United States Patent and Trademark Office*